United States Patent
Sato et al.

(10) Patent No.: US 8,648,978 B2
(45) Date of Patent: Feb. 11, 2014

(54) TELEVISION AND ELECTRONIC APPARATUS

(75) Inventors: Yuki Sato, Ome (JP); Hideo Shirasaka, Hamura (JP)

(73) Assignee: Kabushiki Kaisha Toshiba, Tokyo (JP)

(*) Notice: Subject to any disclaimer, the term of this patent is extended or adjusted under 35 U.S.C. 154(b) by 65 days.

(21) Appl. No.: 13/330,479

(22) Filed: Dec. 19, 2011

(65) Prior Publication Data

US 2012/0249891 A1 Oct. 4, 2012

(30) Foreign Application Priority Data

Mar. 31, 2011 (JP) ................................. 2011-078678

(51) Int. Cl.
*G02F 1/1333* (2006.01)
*H01J 17/49* (2012.01)
*H04N 5/64* (2006.01)

(52) U.S. Cl.
USPC .............................. 349/58; 313/582; 348/794

(58) Field of Classification Search
USPC .................... 349/58; 313/582–587, 498–512; 361/681; 348/794; 345/905; 362/632–634
See application file for complete search history.

(56) References Cited

U.S. PATENT DOCUMENTS

| | | | |
|---|---|---|---|
| 6,459,460 B1 | 10/2002 | Yamanaka | |
| 6,882,108 B2 * | 4/2005 | Kim et al. | 313/582 |
| 7,652,729 B2 * | 1/2010 | Minaguchi et al. | 349/58 |
| 7,864,138 B2 * | 1/2011 | Kim et al. | 345/58 |
| 2002/0043607 A1 * | 4/2002 | Tajima | 248/473 |
| 2003/0048598 A1 * | 3/2003 | Lee et al. | 361/681 |
| 2004/0242110 A1 * | 12/2004 | Matsuda et al. | 445/6 |
| 2007/0295973 A1 * | 12/2007 | Jinbo et al. | 257/88 |
| 2008/0150427 A1 * | 6/2008 | Uchida et al. | 313/582 |
| 2009/0091681 A1 * | 4/2009 | Nishizawa et al. | 349/58 |
| 2011/0110046 A1 * | 5/2011 | Itoh et al. | 361/709 |

FOREIGN PATENT DOCUMENTS

| | | |
|---|---|---|
| JP | 04-107497 | 4/1992 |
| JP | 4-101577 | 9/1992 |
| JP | 11-289169 | 10/1999 |
| JP | 2005-019082 A | 1/2005 |
| JP | 2007-256586 | 10/2007 |
| JP | 2008-216844 | 9/2008 |
| JP | 2009-086560 A | 4/2009 |
| JP | 2009-133936 | 6/2009 |
| JP | 2009-259691 A | 11/2009 |
| JP | 2009259691 A * | 11/2009 |
| WO | WO 2010/007827 | 1/2010 |

OTHER PUBLICATIONS

First Office Action mailed by Japan Patent Office on Apr. 17, 2012 in the corresponding Japanese patent application No. 2011-078678.
Final Office Action mailed by Japan Patent Office on Jul. 10, 2012 in the corresponding Japanese patent application No. 2011-078678.

* cited by examiner

*Primary Examiner* — Bumsuk Won
*Assistant Examiner* — Jia Pan
(74) *Attorney, Agent, or Firm* — Knobbe, Martens, Olson & Bear LLP

(57) ABSTRACT

According to one embodiment, an electronic apparatus includes a housing, a display in the housing, a diffuser, and a light guide. The housing is configured to shield light and comprises an opening. The display includes a screen exposed through the opening, a first flexible substrate, a second flexible substrate, and a liquid crystal layer between the first flexible substrate and the second flexible substrate. The diffuser overlaps the display. The light guide overlaps the diffuser.

15 Claims, 23 Drawing Sheets

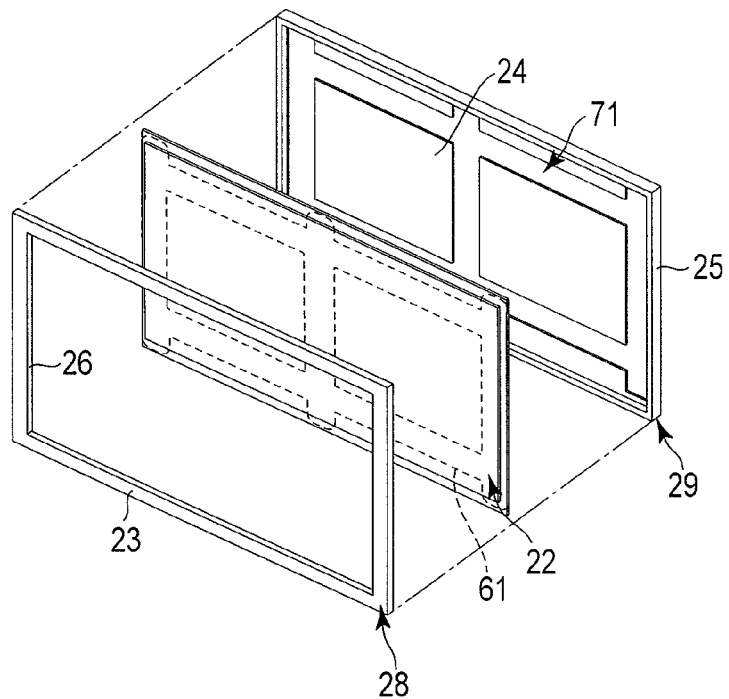
F I G. 7
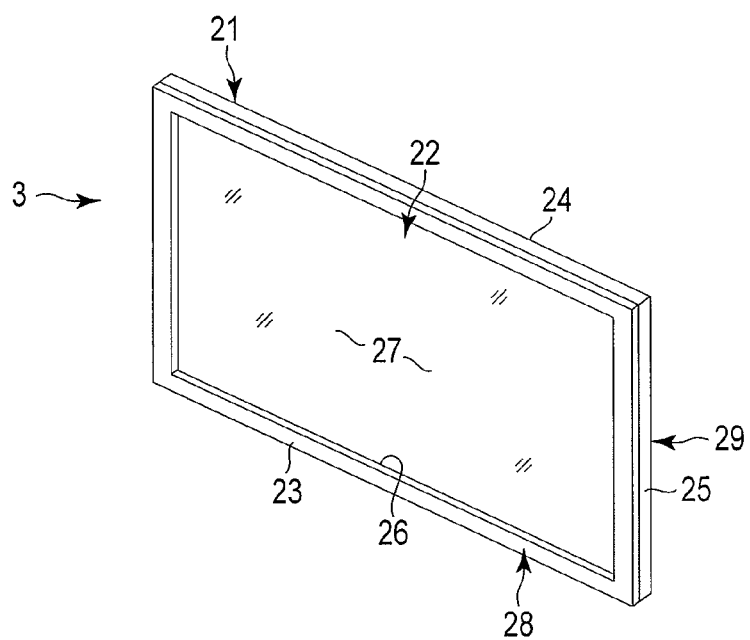
F I G. 8

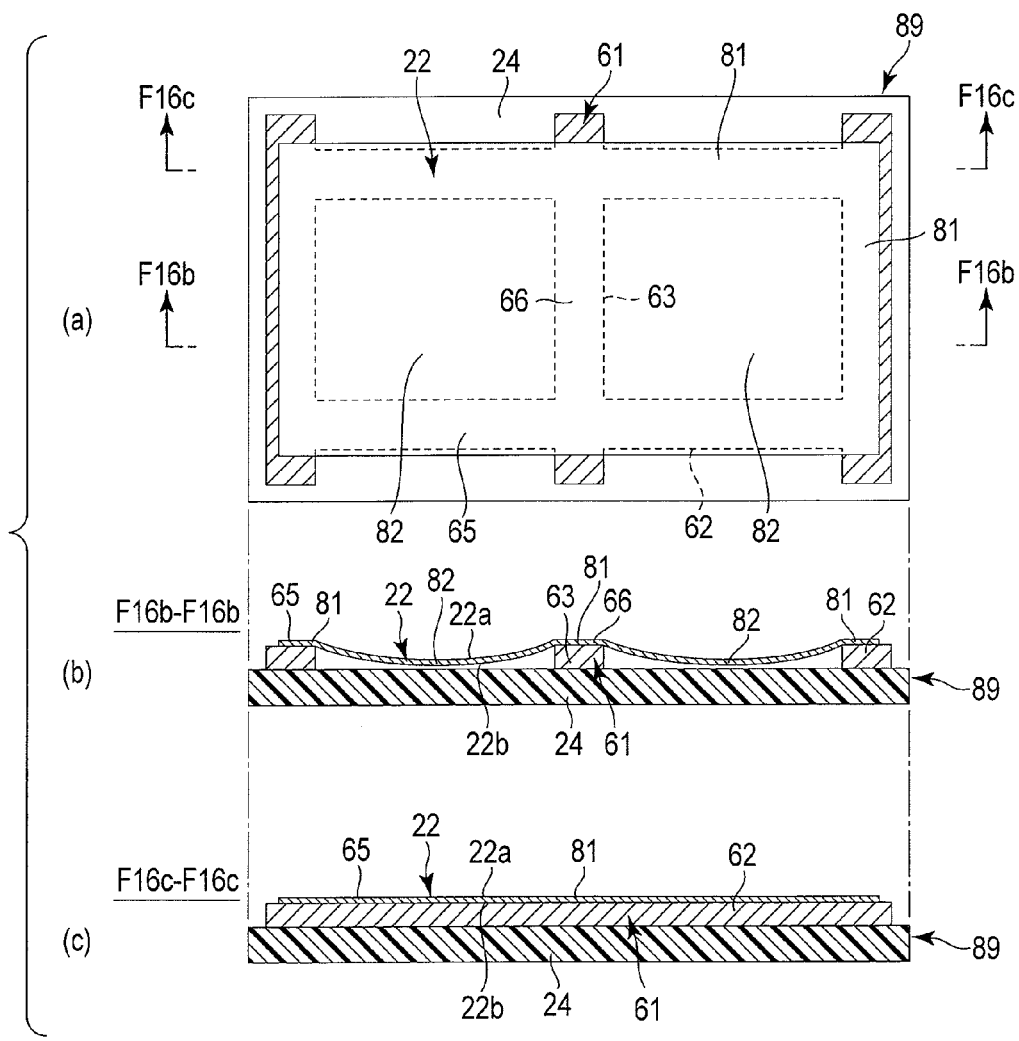
F I G. 16

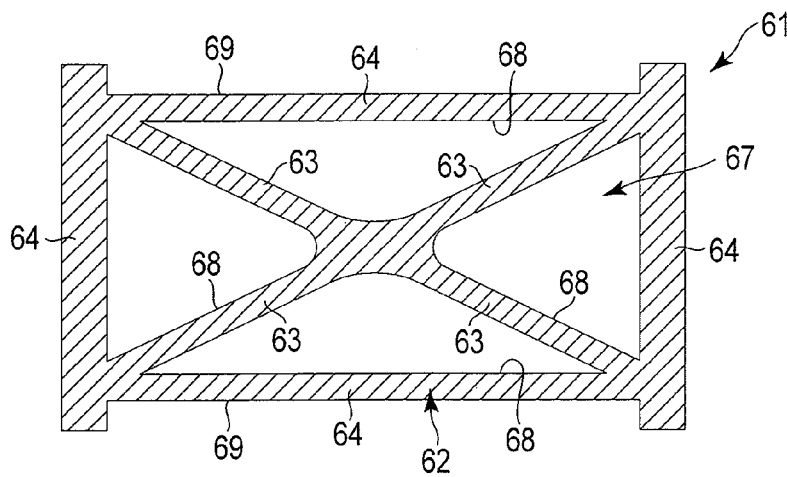
F I G. 17
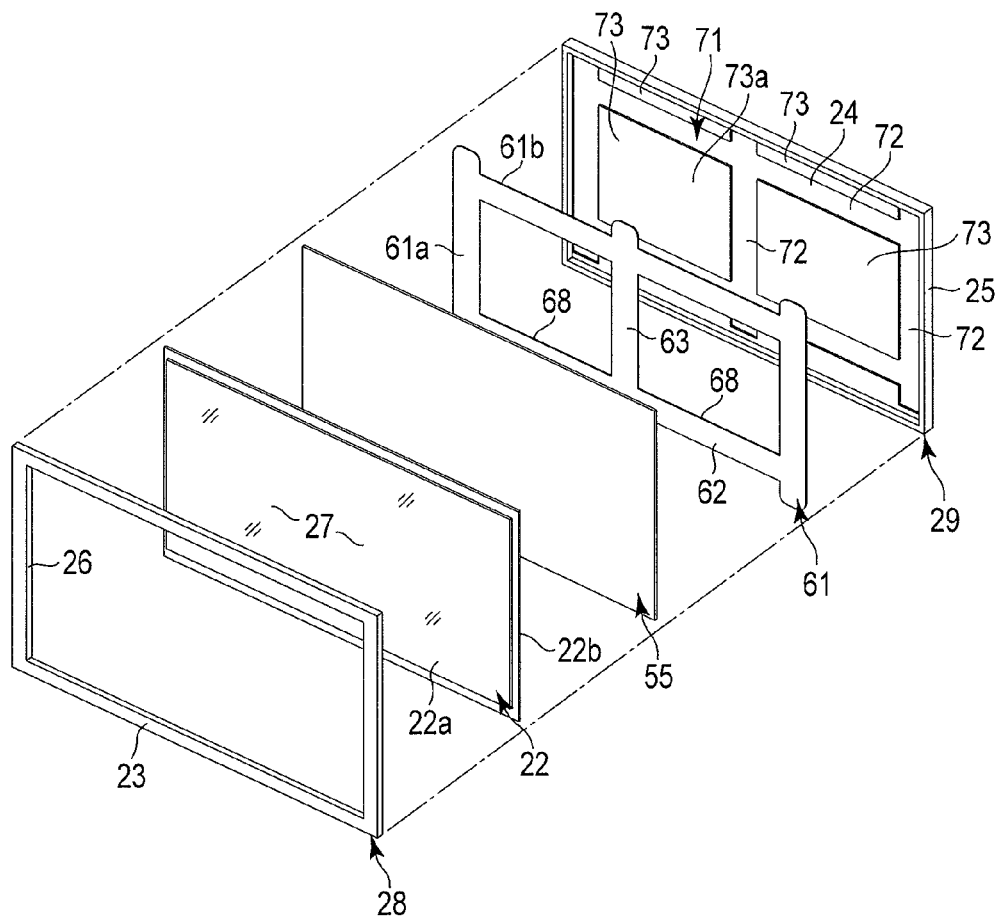
F I G. 18

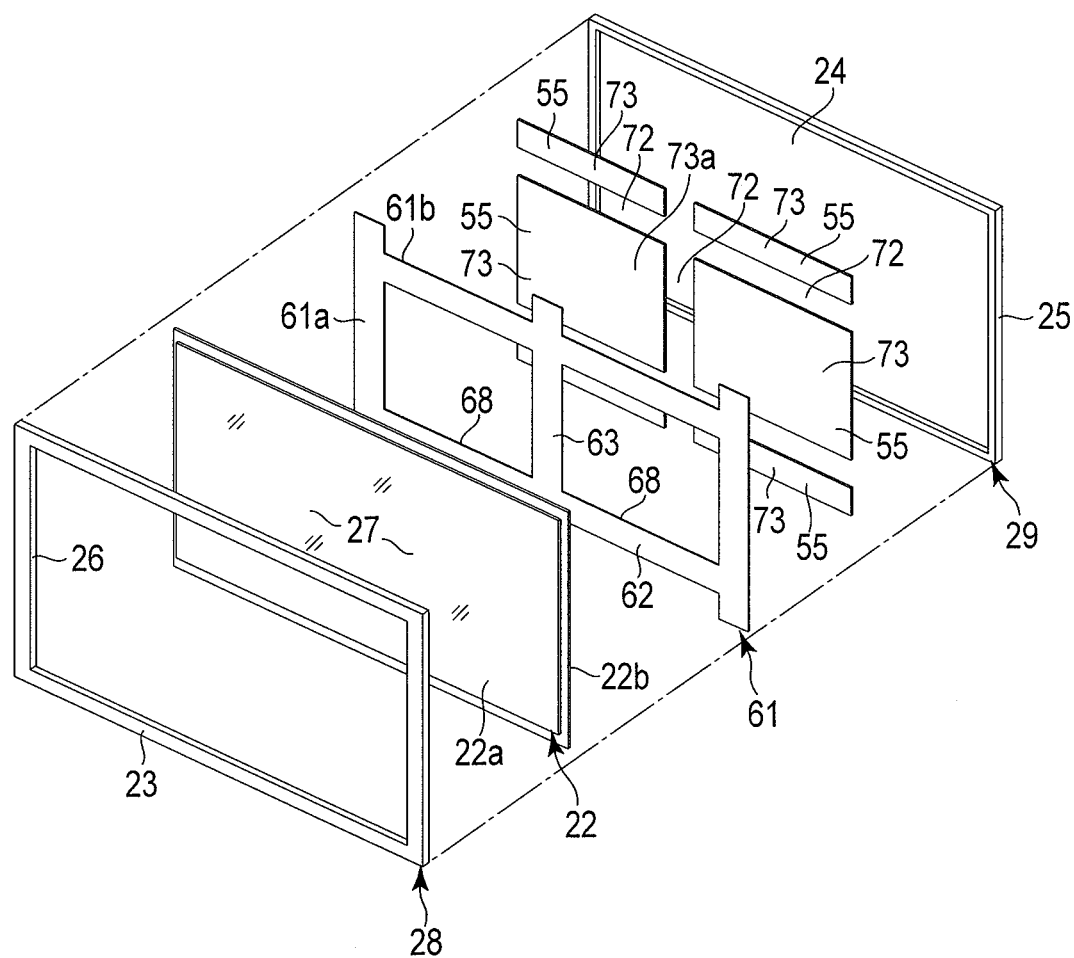
F I G. 20

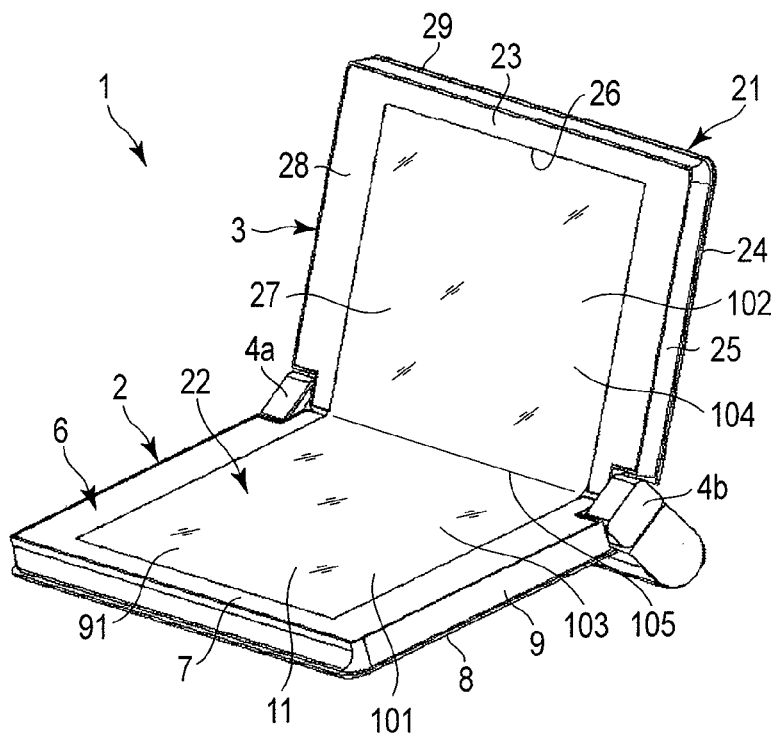
F I G. 24
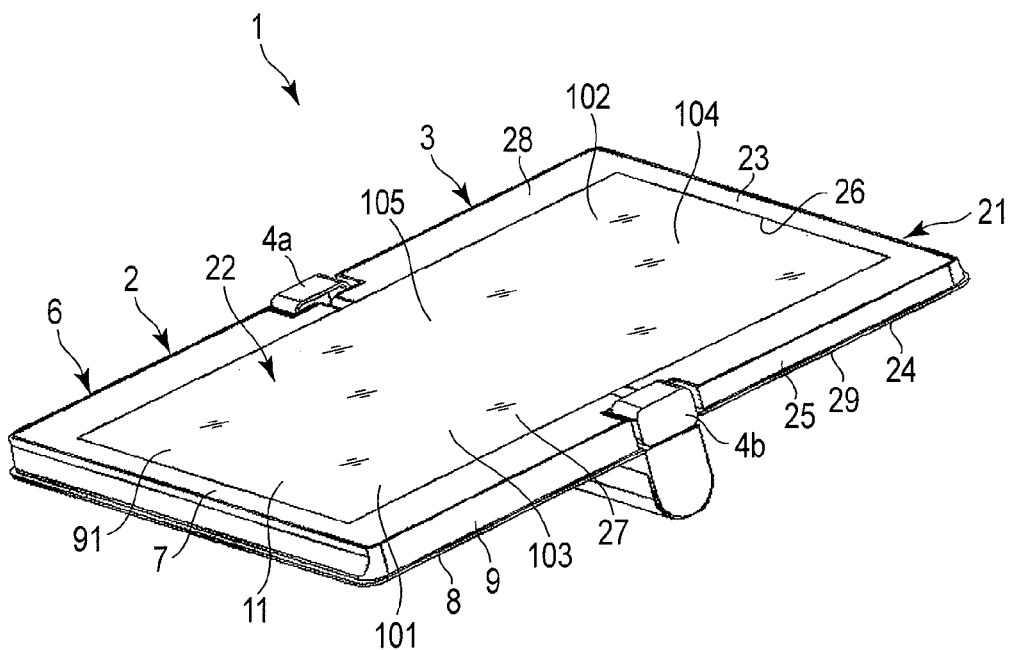
F I G. 25

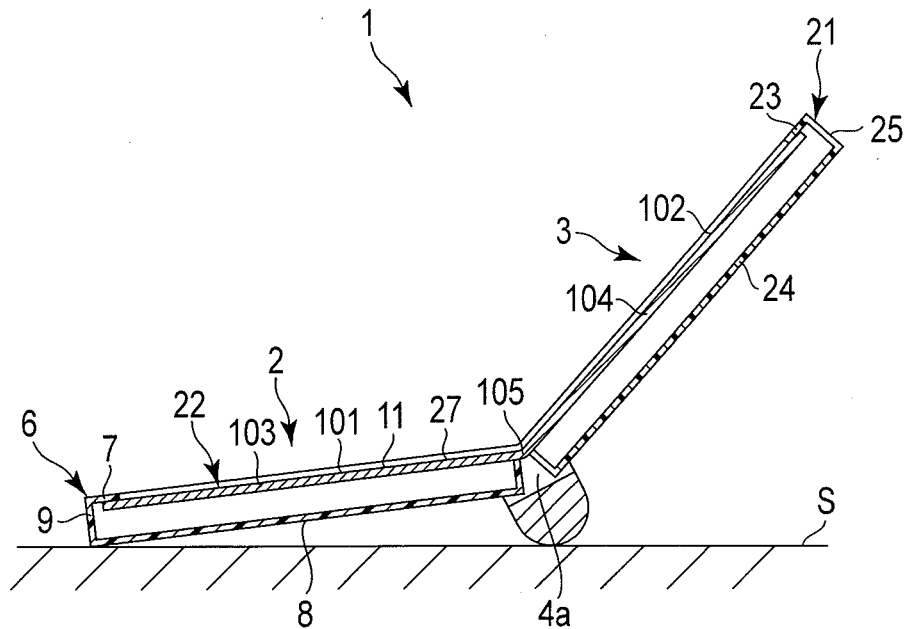
F I G. 26
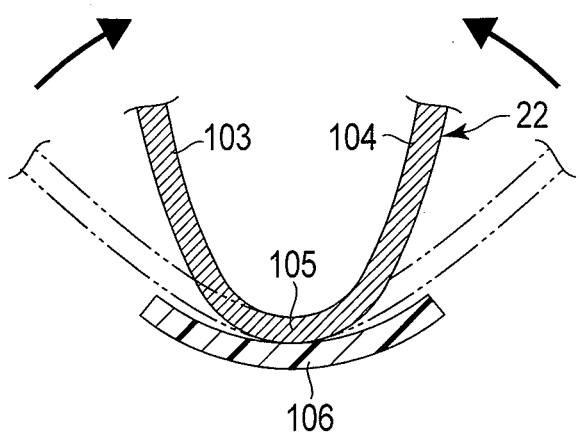
F I G. 27

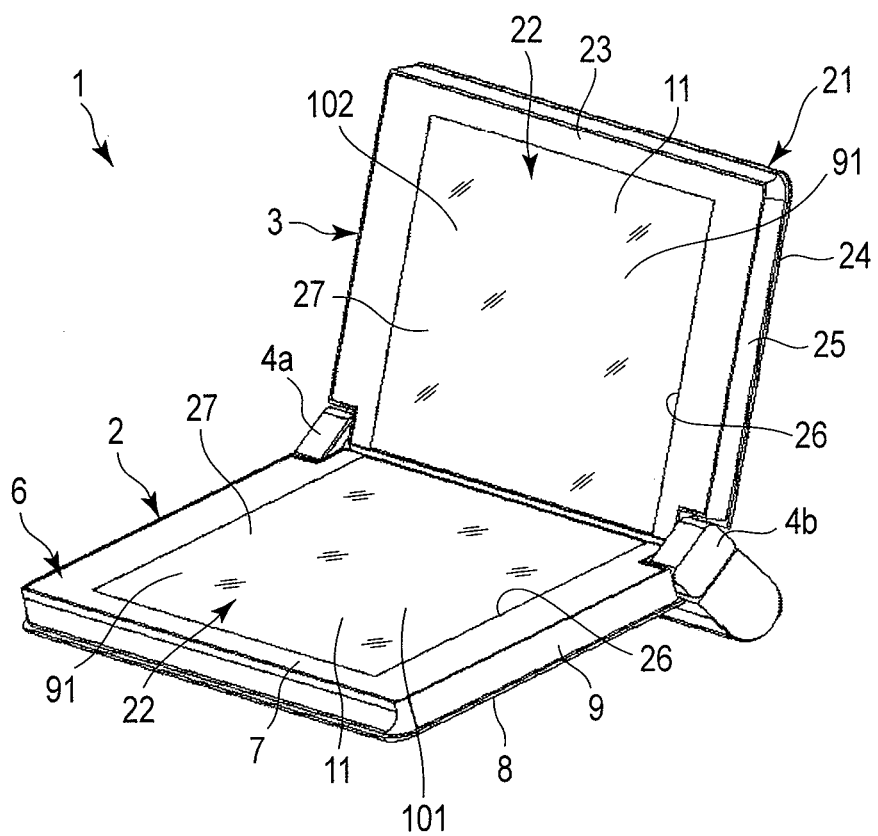
F I G. 28

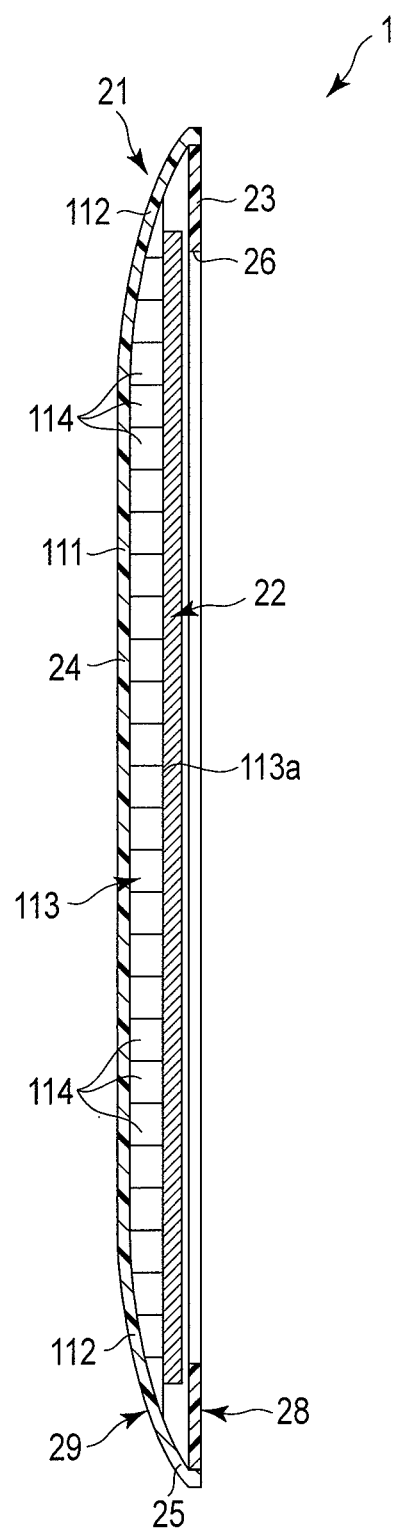
F I G. 29

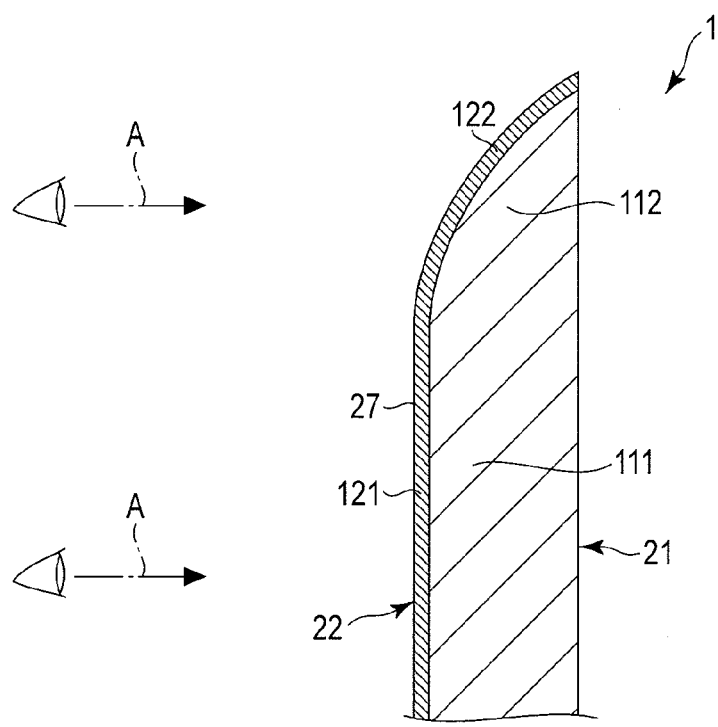
F I G. 31
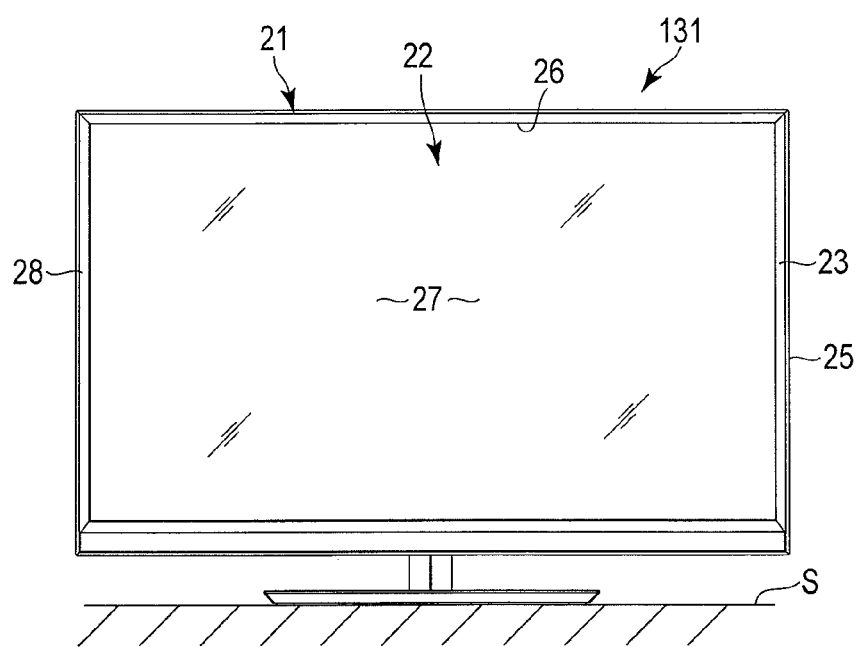
F I G. 32

TELEVISION AND ELECTRONIC APPARATUS

CROSS-REFERENCE TO RELATED APPLICATIONS

This application is based upon and claims the benefit of priority from prior Japanese Patent Application No. 2011-078678, filed Mar. 31, 2011, the entire contents of which are incorporated herein by reference.

FIELD

Embodiments described herein relate generally to televisions and electronic apparatuses.

BACKGROUND

Some electronic apparatuses include a housing, a liquid crystal panel, and a backlight.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 7 is an exemplary perspective view illustrating an assembly of a mask, a cover, and the component shown in FIG. 5;

FIG. 8 is an exemplary perspective view illustrating the display unit of the electronic apparatus according to the second embodiment;

FIG. 16 is an exemplary view schematically illustrating a structure of a portion of the display unit related to the second embodiment, wherein (a) is an exemplary plan view schematically illustrating the structure of the portion of the display unit, (b) is an exemplary cross-sectional view schematically illustrating the structure of the portion of the display unit taken along the line F16b-F16b, and (c) is an exemplary cross-sectional view schematically illustrating the structure of the portion of the display unit taken along the line F16c-F16c;

FIG. 17 is an exemplary plan view illustrating a modification of the back plate shown in FIG. 5;

FIG. 18 is an exemplary exploded perspective view illustrating a display unit of an electronic apparatus according to a third embodiment;

FIG. 20 is an exemplary exploded perspective view illustrating a display unit of an electronic apparatus according to a fifth embodiment;

FIG. 24 is an exemplary perspective view illustrating an electronic apparatus according to a seventh embodiment;

FIG. 25 is an exemplary perspective view illustrating another state of the electronic apparatus shown in FIG. 24;

FIG. 26 is an exemplary cross-sectional view illustrating the electronic apparatus shown in FIG. 24;

FIG. 27 is an exemplary cross-sectional view illustrating the structure of a portion of the electronic apparatus shown in FIG. 24;

FIG. 28 is an exemplary perspective view illustrating an electronic apparatus according to an eighth embodiment;

FIG. 29 is an exemplary cross-sectional view illustrating a display unit of an electronic apparatus according to a ninth embodiment;

FIG. 31 is an exemplary cross-sectional view schematically illustrating a portion of an electronic apparatus according to a tenth embodiment; and FIG. 32 is an exemplary front view illustrating a television according to an eleventh embodiment.

DETAILED DESCRIPTION

Various embodiments will be described hereinafter with reference to the accompanying drawings.

In general, according to one embodiment, an electronic apparatus comprises a housing, a display in the housing, a diffuser, and a light guide. The housing is configured to shield light and comprises an opening. The display comprises a screen exposed through the opening, a first flexible substrate, a second flexible substrate, and a liquid crystal layer between the first flexible substrate and the second flexible substrate. The diffuser overlaps the display. The light guide overlaps the diffuser.

Hereinafter, embodiments will be described with reference to the drawings.

First Embodiment

Figure 1:
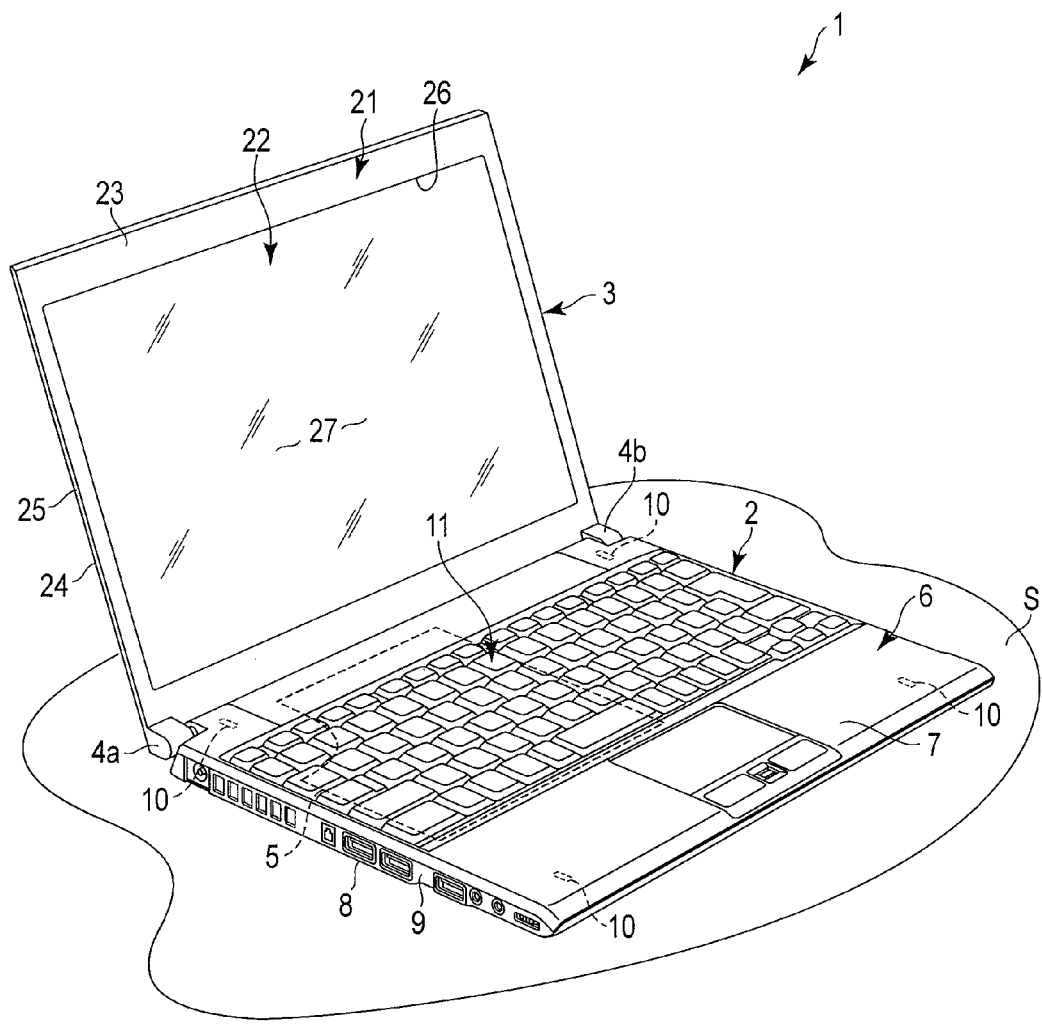
FIG. 1 is an exemplary perspective view illustrating an electronic apparatus according to a first embodiment.

FIGS. 1, 2, 3, and 4 show an electronic apparatus 1 according to a first embodiment. The electronic apparatus 1 is, for example, a notebook portable computer (notebook PC). As shown in FIG. 1, the electronic apparatus 1 includes a first unit 2, a second unit 3, and hinge portions 4a and 4b.

The first unit 2 is, for example, a main unit having a circuit board 5 provided therein. An example of the circuit board 5 is a main board having a CPU mounted thereon. The first unit 2 includes a first housing 6. The first housing 6 has a flat box shape including an upper wall 7, a lower wall 8, and a circumferential wall 9. In the specification, the upper, lower, left, and right sides are defined in the viewing direction of the user. The side close to the user is defined as the "front side" and the side away from the user is defined as the "rear side".

The lower wall 8 faces a desk surface S (mounting surface) when the electronic apparatus 1 is placed on a desk. For example, a plurality of leg portions 10 that comes into contact with the desk surface S is provided on the lower wall 8. The upper wall 7 is opposite to the lower wall 8 with a space therebetween and extends substantially in parallel to the lower wall 8.

The upper wall 7 is provided with an input portion 11 (input receiving portion). An example of the input portion 11 is a keyboard. The input portion 11 is not limited thereto, but it may be a touch panel (touch sensor) or other input devices. The circumferential wall 9 extends in a direction crossing the lower wall 8 and the upper wall 7 and connects the edge of the lower wall 8 and the edge of the upper wall 7.

The second unit 3 is, for example, a display unit and includes a second housing 21 and a flexible display 22 that is provided in the second housing 21. The flexible display 22 is an example of a "display module".

The flexible display 22 includes a display screen 27. Images are displayed on the display screen 27 under the control of the CPU mounted on, for example, the circuit board 5. In the specification, the "images" may include various kinds of information displayed on the screen, such as characters, symbols, figures, sentences, images, moving pictures, and web pages, but are not limited to images such as illustrations or photographs. The details of the flexible display 22 will be described below.

The second housing 21 includes a front wall 23, a rear wall 24 (back wall), and a circumferential wall 25. The front wall 23 is an example of a "first wall". The front wall 23 expands substantially in parallel to the display screen 27. The front wall 23 includes an opening 26 through which a display screen 27 is exposed. In the specification, the term "exposure" includes a case in which the display screen is adjacent to, for example, the opening and is directly exposed from the opening and a case in which a transparent member (or an opaque member), such as a touch sensor, is provided between the display screen and the opening and the display screen is exposed to the outside through the transparent member (or the opaque member). That is, when the display screen is visible from the outside, the display screen is regarded to be "exposed" in the specification.

The rear wall 24 is an example of a "second wall". The rear wall 24 is disposed opposite to the front wall 23. The rear wall 24 is opposite to the front wall 23 with a space therebetween and expands substantially in parallel to the front wall 23. The circumferential wall 25 extends in a direction crossing the front wall 23 and the rear wall 24 and connects the edge of the front wall 23 and the edge of the rear wall 24.

The second housing 21 is rotatably (openably) connected to the first housing 6 by the hinge portions 4a and 4b. In this way, the electronic apparatus 1 can be opened or closed between a first position where the first unit 2 and the second unit 3 overlap each other and a second position where the first unit 2 is opened from the second unit 3. At the second position, the input portion 11 of the first unit 2 and the display screen 27 of the second unit 3 are exposed to the outside of the electronic apparatus 1.

Next, the flexible display 22 and the mounting structure thereof will be described in detail.

Figure 2:
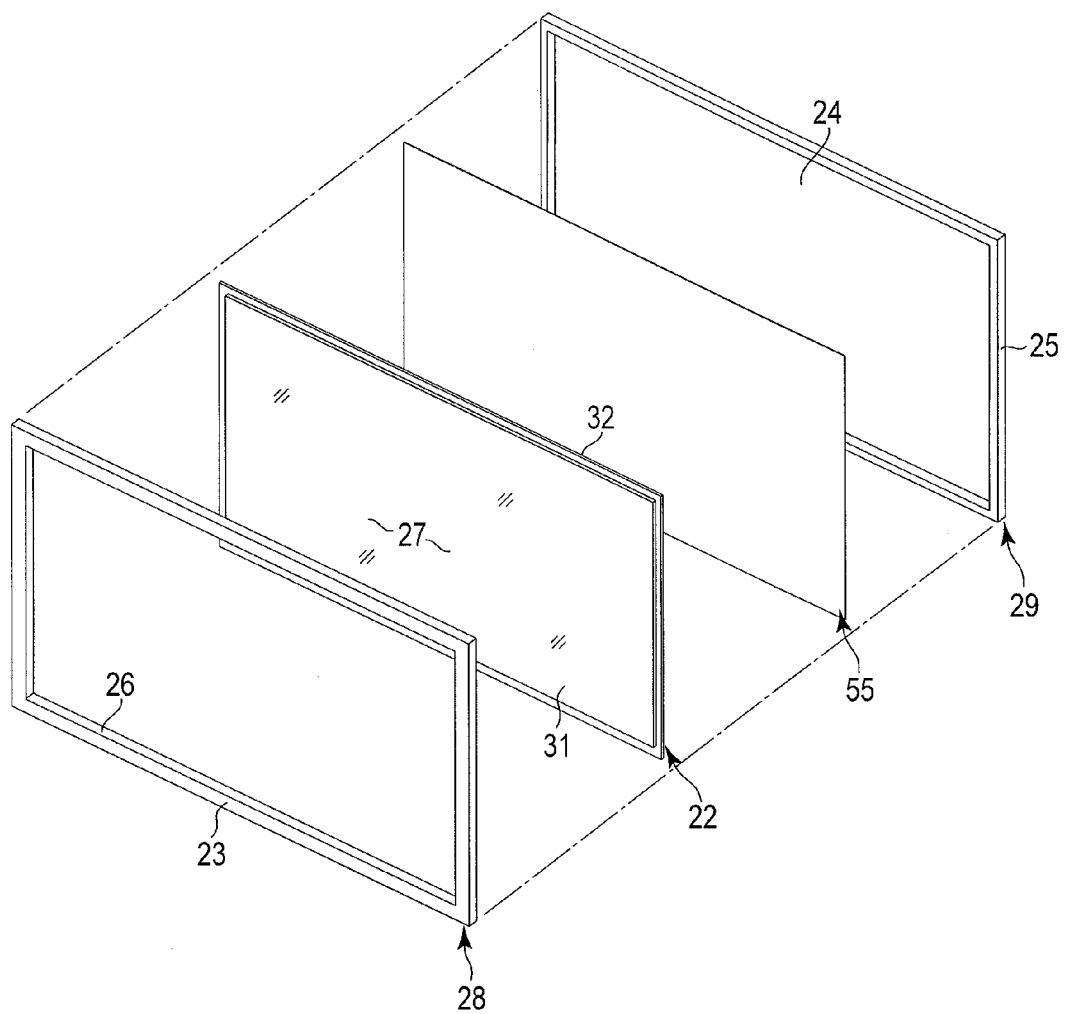
FIG. 2 is an exemplary exploded perspective view illustrating a display unit of the electronic apparatus shown in FIG. 1.
Figure 3:
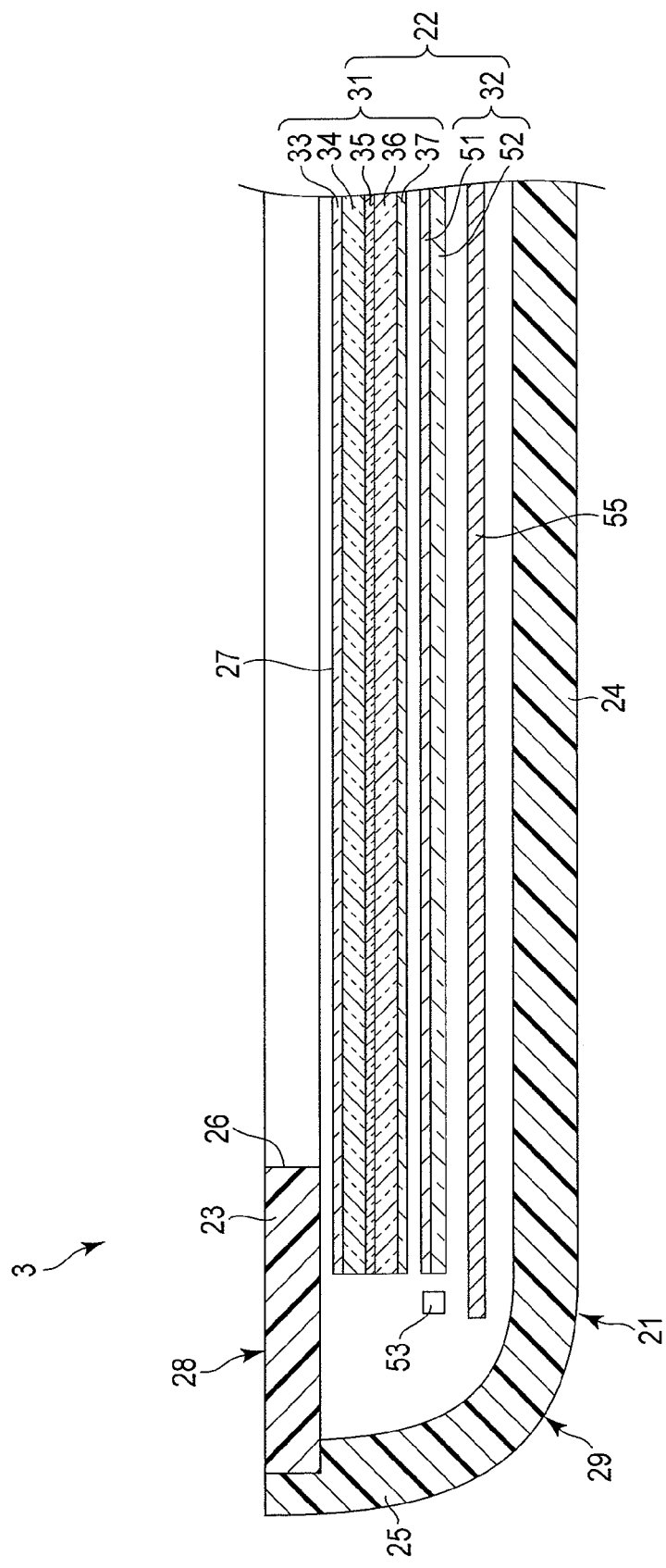
FIG. 3 is an exemplary cross-sectional view schematically illustrating an internal structure of the display unit of the electronic apparatus shown in FIG. 1.

As shown in FIGS. 2 and 3, the second housing 21 (hereinafter, simply referred to as a housing 21) is mainly divided into a mask 28 (LCD mask) and a cover 29 (LCD cover). The mask 28 is an example of a "first member" and includes the front wall 23. The cover 29 is an example of a "second member" and includes the rear wall 24 and the circumferential wall 25. A portion of the circumferential wall 25 may be provided in the mask 28. The mask 28 and the cover 29 are combined with each other to form the housing 21. The mask 28 and the cover 29 may be made of metal or plastic.

The cover 29 has, for example, a light shielding property (light shielding function) and is configured so as to suppress the transmission of light from the outside. That is, the cover 29 has, for example, a predetermined thickness, a predetermined material, or a predetermined color and is configured so as to substantially or completely suppress the incidence of light on the inside of the housing 21 from the outside of the housing 21. Various structures can be applied in order to suppress the incidence of light. For example, it is considered that the cover 29 is made of a non-transparent or non-opaque material (that is, a material that does not transmit light). For example, similarly to the cover 29, the mask 28 has a light shielding function and is configured so as to suppress the transmission of light from the outside.

Figure 4:
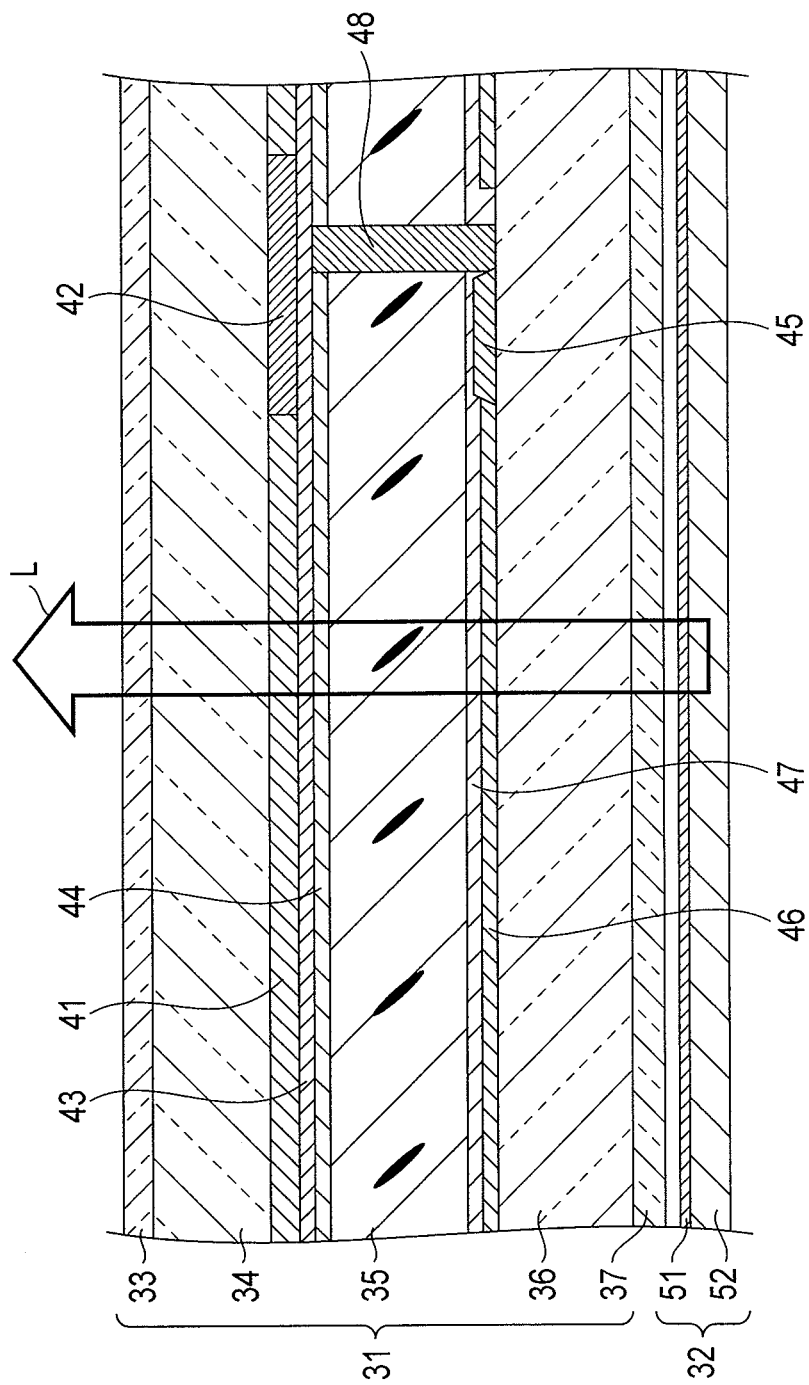
FIG. 4 is an exemplary cross-sectional view schematically illustrating a structure of a display module shown in FIG. 3.

FIGS. 2, 3, and 4 schematically show an example of the flexible display 22. The flexible display 22 is a sheet display and has a light weight, a small thickness like, for example, a sheet, and flexibility (bendability). In addition, for example, the flexible display 22 can be bent or rolled.

Only a change in the substrate material of a general liquid crystal display from glass to plastic is insufficient to develop the flexible display, and it is necessary to solve various technical problems in order to develop the flexible display.

There are some technical problems. For example, (1) it is necessary to reduce a thin film transistor (TFT) formation temperature. That is, a plastic substrate is weak against heat and has low heat resistance, as compared to a glass substrate. For heat resistance, polyimide (PI) has a relative high heat resistance against 350° C. or less, and polyethylene terephthalate (PET) has hest resistance against to 150° C. or less. When the TFT is formed at a temperature more than the above-mentioned temperature, for example, the substrate is warped or the characteristics of liquid crystal and a driving circuit are changed. As a result, color irregularity is likely to occur in the screen. Therefore, for the plastic substrate, the TFT needs to be formed at a low temperature.

However, the formation temperature of low-temperature polysilicon, which is a TFT material, is equal to or less than about 600° C. and the formation temperature of amorphous silicon is equal to or less than about 350° C. It is not easy to form the TFT with these materials using a low-temperature process that is allowed for the plastic substrate.

In general, as the temperature is reduced, crystallinity is reduced and the mobility of an electron is reduced, which makes it difficult to obtain a high-definition image. When polycrystalline silicon that is capable of obtaining a high-definition image and has high electron mobility is used, the TFT formation temperature is high. When amorphous silicon that can be formed at a low temperature is used, the mobility of the electron is reduced.

(2) The plastic substrate is flexible and has low mechanical shape stability. In addition, in many cases, the plastic substrate has low dimension stability and low solvent resistance due to a thermal expansion coefficient or a water absorption coefficient. It is difficult to form the TFT on the plastic substrate.

(3) When the panel is bent, it is difficult to maintain the thickness of liquid crystal interposed between two plastic substrates to be constant due to tensile force or compression force. When the thickness of the liquid crystal becomes unstable, a defect in the alignment of liquid crystal molecules or other defects is likely to occur.

However, the present applicant conducted various studies and developed the following flexible display 22. Hereinafter, the flexible display 22 will be described in detail.

As shown in FIG. 4, the flexible display 22 includes a flexible panel 31 and a flexible backlight 32. The flexible panel 31 is an example of a "panel" and is also an example of a "display". The flexible panel 31 includes a first polarizing plate 33, a first plastic substrate 34, a liquid crystal layer 35, a second plastic substrate 36, and a second polarizing plate 37.

The first plastic substrate 34 is an example of a "first flexible substrate" and is also an example of a "first plastic film". The first plastic substrate 34 is a color filter substrate and includes, for example, a micro color filter 41 that transmits red (R) light, green (G) light, and blue (B) light and a black matrix 42. The micro color filter 41 mixes three primary color pixels that are too small to be seen by the naked eye. In addition, the first plastic substrate 34 includes a transparent electrode 43 and an alignment film 44.

The second plastic substrate 36 is an example of a "second flexible substrate" and is also an example of a "second plastic film". The second plastic substrate 36 is an array substrate and includes TFTs 45, which are configured to drive elements (active elements) for driving the pixels. In addition, the second flexible substrate 36 includes transparent electrodes 46 (pixel electrodes) and an alignment film 47.

The second plastic substrate 36 according to this embodiment includes oxide semiconductor TFTs as the TFTs 45. The oxide semiconductor TFT can be formed at a relatively low temperature (for example, room temperature). In the oxide semiconductor TFT, the conduction path of the element is a spherical electron orbital. Therefore, in an amorphous state, the mobility of the oxide semiconductor TFT is about ten times more than that of a silicon semiconductor. For example, in the oxide semiconductor TFT, amorphous IGZO (In—Ga—Zn—O) is used as a channel material. The material forming the oxide semiconductor TFT is not limited thereto. For example, the oxide semiconductor TFT may be made of polycrystalline ZnO or other materials.

Similarly to the amorphous silicon, when the oxide semiconductor TFT is driven, the threshold voltage thereof is changed. Therefore, it is necessary to improve driving reliability.

In order to solve this problem, the present applicant found that there was a correlation between the driving reliability of the oxide semiconductor TFT and the movement of hydrogen in the film. In this way, it was possible to form the oxide semiconductor TFT with high reliability by optimizing the deposition conditions and the annealing temperature of the oxide semiconductor and controlling the density of hydrogen in an insulating film. The present applicant performed a bias temperature stress (BTS) test on the TFT which was manufactured by the above-mentioned method and the test result proved that the driving reliability of the oxide semiconductor TFT was about one hundred times more than that of the amorphous silicon, which was substantially equal to that of a high-performance polycrystalline silicon.

Examples of the material forming the first and second plastic substrates 34 and 36 include polyether sulfone (PES) with high heat resistance, polyethylene naphthalate (PEN) or polyethylene terephthalate (PET) with a small thermal expansion coefficient and a small water absorption coefficient, polycarbonate (PC), and polyimide (PI). The material forming the first and second plastic substrates 34 and 36 is not limited thereto, but various kinds of materials may be appropriately used. The flexible panel 31 is provided with the first and second plastic substrates 34 and 36 to include a resin material.

The first and second plastic substrates 34 and 36 have flexibility (bendability). The thickness of a glass substrate of a general liquid crystal display is, for example, several hundreds of micrometers. In contrast, the thickness of each of the first and second plastic substrates 34 and 36 is, for example, several tens of micrometers to about a hundred of micrometers.

As shown in FIG. 4, the liquid crystal layer 35 is disposed between the first and second plastic substrates 34 and 36. The liquid crystal layer 35 includes liquid crystal molecules, which are voltage-variable optical materials. The arrangement of the liquid crystal molecules is controlled by the alignment films 44 and 47 provided in the first and second plastic substrates 34 and 36. When a voltage is applied to the liquid crystal layer 35, the arrangement of the liquid crystal molecules is changed and a refractive index is changed.

Spacers 48 are provided between the first and second plastic substrates 34 and 36. The spacers 48 maintain the gap between the first and second plastic substrates 34 and 36, that is, the thickness of the liquid crystal layer 35 to be constant.

An example of the spacer 48 is a columnar spacer or a spherical spacer manufactured by a photofabrication technique (photolithography). The spacers are fixed to, for example, one of the first and second plastic substrates 34 and 36.

The flexible display 22 is flexible, unlike the general liquid crystal display. When the flexible display 22 is bent, force to reduce the gap between the two plastic substrates 34 and 36 is applied to a bent central portion and force to increase the gap between the two plastic substrates 34 and 36 is applied to the edge of the flexible display. In this case, it is difficult to maintain the gap between the two plastic substrates 34 and 36 in the region in which the force to increase the gap is applied with the spacers fixed to one of the first and second plastic substrates 34 and 36.

In this embodiment, the spacers 48 (adhesive spacers) suitable for the flexible display 22 are used. In this embodiment, for example, the spacers 48 are fixed to both the first and second plastic substrates 34 and 36. In this way, even when the flexible display 22 is bent, the spacers 48 maintain the gap between the two plastic substrates 34 and 36 to be constant and maintain the thickness of the liquid crystal layer 35 to be constant. Therefore, for example, a defect in the arrangement of the liquid crystal molecules is suppressed.

As a method of connecting the spacers 48 to both the two plastic substrates 34 and 36, for example, the following methods may be used: a method of forming a thermosoftening polymer structure on one substrate and connecting the thermosoftening polymer structure to the other substrate by thermocompression bonding; and a method of attaching the end of the spacer manufactured by photolithography or a nanoimprint method, which is a high-definition printing method, to the substrate with a photo-curable adhesive.

As shown in FIGS. 3 and 4, the first polarizing plate 33 (first polarizing filter) overlaps the first plastic substrate 34. The first polarizing plate 33 faces the opening 26 of the housing 21 and is exposed to the outside of the housing 21 through the opening 26. The second polarizing plate 37 (second polarizing filter) overlaps the second plastic substrate 36.

As shown in FIGS. 3 and 4, the flexible backlight 32 includes a diffusion plate 51 (diffuser), a light guide plate 52, and an LED 53. The light guide plate 52 is an example of a "light guide" and guides light emitted from the LED 53 to the flexible panel 31. The light guide plate 52 is disposed between the flexible panel 31 and the rear wall 24 of the housing 21. An example of the light guide plate 52 is a thin plastic light guide plate. The thin plastic light guide plate is a thin plastic film. Light emitted from the LED is diffused while passing through the thin plastic light guide plate, and display light L is emitted from the surface of the thin plastic light guide plate. The LED 53 is an example of a light source and is arranged, for example, on the side of the light guide plate 52.

The diffusion plate 51 is disposed between the flexible panel 31 and the light guide plate 52 and overlaps the light guide plate 52. That is, the diffusion plate 51 overlaps the flexible panel 31 and the light guide plate 52 overlaps the diffusion plate 51. The diffusion plate 51 is an example of a "diffuser" (member that diffuses light). The diffusion plate 51 diffuses the display light L from the light guide plate 52 into uniform surface light. The "diffuser" may be a light diffusion film. For example, when another member, such as a polarizing sheet, has a sufficient light diffusion function, the diffusion plate 51 may be omitted.

As shown in FIG. 3, the flexible panel 31 is disposed between the front wall 23 and the rear wall 24 of the housing 21. The flexible backlight 32 is disposed between the flexible panel 31 and the rear wall 24 of the housing 21. The flexible backlight 32 emits the display light L to the flexible panel 31.

As shown in FIG. 3, a light shielding member 55 is provided between the flexible backlight 32 and the rear wall 24 of the housing 21. The light shielding member 55 has, for example, a plate shape (sheet shape). The outward shape of the light shielding member 55 is substantially the same as that of the flexible display 22, or the light shielding member 55 has a size more than that of the flexible display 22 and covers the rear side of the flexible display 22. The light shielding member 55 shields light to pass through the rear wall 24 toward the user.

According to this structure, it is possible to reduce the thickness of an electronic apparatus. That is, the electronic apparatus 1 according to this embodiment includes the flexible display 22. For example, since the flexible display 22 is thinner than the general liquid crystal display, the flexible display 22 is likely to be see-through. That is, for example, light is likely to pass through the flexible display 22 from the rear side to the front side. Therefore, when the rear wall 24 is made of a material that transmits light a little, the light passes through the flexible display 22. As a result, for example, a defect, such as color irregularity, is likely to occur in the display screen 27.

In contrast, in this embodiment, the housing 21 containing the flexible display 22 has a light shielding function. Therefore, light is less likely to enter into the rear side of the flexible display 22 from the outside of the housing 21 and it is possible to suppress a defect, such as color irregularity, from occurring in the display screen 27. Therefore, it is possible to improve the visibility of the screen. That is, according to this structure, it is possible to solve new subjects which are likely to occur due to the use of the flexible display 22 and provide a mounting structure suitable for the flexible display 22. In this way, the mounting of the flexible display 22 makes it possible to reduce the thickness of the electronic apparatus 1.

In this embodiment, the light shielding member 55 is provided between the flexible display 22 and the rear wall 24 of the housing 21. When the light shielding member 55 is provided, it is possible to further suppress light from passing through the flexible display 22 from the rear side to the front side. Therefore, it is possible to improve the visibility of the screen.

Second Embodiment

Next, an electronic apparatus 1 according to a second embodiment will be described with reference to FIGS. 5 to 17. In the second embodiment, components having the same or similar functions as those in the first embodiment are denoted by the same reference numerals and a description thereof will not be repeated. Structures other than the following structures are the same as those in the first embodiment.

Figure 5:
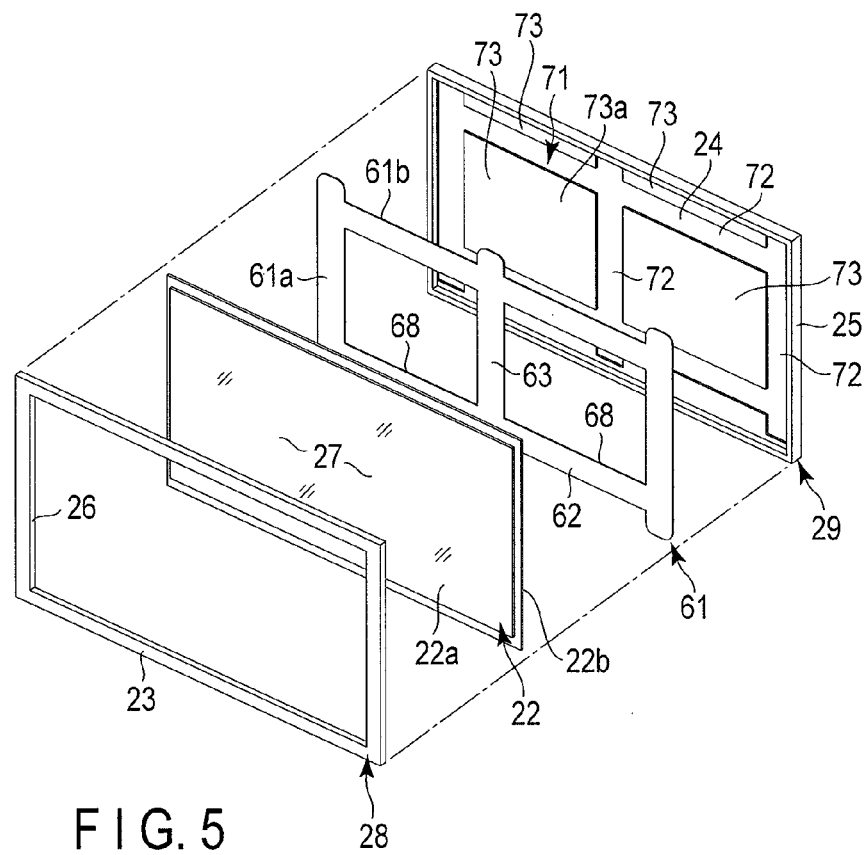
FIG. 5 is an exemplary exploded perspective view illustrating a display unit of an electronic apparatus according to a second embodiment.

As shown in FIG. 5, the electronic apparatus 1 according to this embodiment includes a back plate 61. The back plate 61 is an example of a "reinforcing member". The back plate 61 is disposed between a flexible display 22 and a rear wall 24 of a housing 21.

A flexible panel 31 and the flexible backlight 32 are fixed to the flexible display 22 by, for example, a double-sided tape, an adhesive, or other methods. The flexible display 22 is exposed through an opening 26 of the housing 21 and includes a first surface 22a including a display screen 27 and a second surface 22b opposite to the first surface 22a.

The back plate 61 is attached to the second surface 22b of the flexible display 22 by, for example, a double-sided tape, an adhesive, or other methods and supports the flexible display 22. That is, the back plate 61 supports the flexible panel 31 and the flexible backlight 32. In the specification, the term "support" includes a case in which the back plate 61 is directly attached to a target member and directly supports the target member and a case in which another member is provided between the back plate 61 and a target member and the back plate 61 indirectly supports the target member via another member.

The back plate 61 is made of, for example, metal or plastic. The strength of the back plate 61 is more than that of the flexible display 22. When the back plate 61 is attached, the flexible display 22 is reinforced.

The rigidity of the back plate 61 is more than that of the flexible display 22 and the back plate 61 is not easily bent. When the back plate 61 is attached, the flexible display 22 is less likely to be bent, as compared to the case in which only the flexible display 22 is provided.

Figure 9:
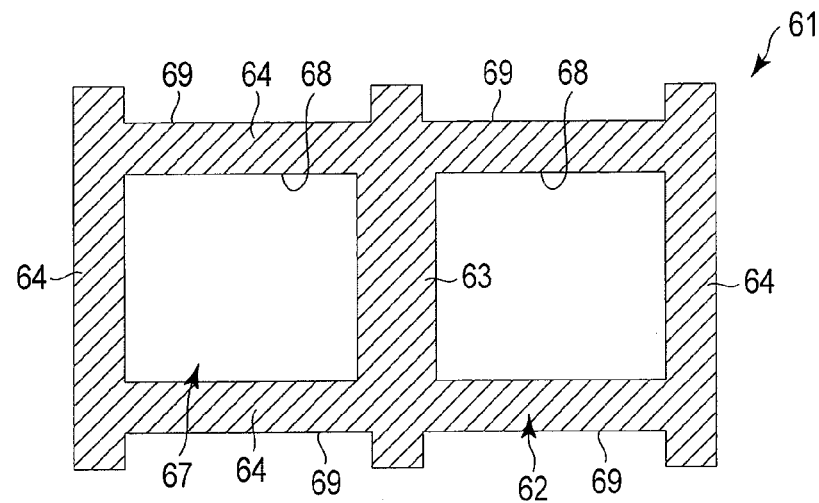
FIG. 9 is an exemplary plan view illustrating the back plate shown in FIG. 5.

As shown in FIGS. 5 and 9, for example, the back plate 61 includes a frame 62 (first portion) and a beam 63 (second portion). For convenience of explanation, in some of the drawings, the back plate 61 is hatched. The frame 62 has, for example, a rectangular frame shape including four side portions 64. The frame 62 corresponds to the end portion 65 of the flexible display 22 and is attached to the end portion 65 of the flexible display 22. In this way, the frame 62 supports the end portion 65 of the flexible display 22.

The beam 63 extends between two long side portions 64 of the frame 62. The beam 63 corresponds to a central portion 66 of the flexible display 22 and is attached to the central portion 66 of the flexible display 22. In this way, the beam 63 supports the central portion 66 of the flexible display 22.

The back plate 61 includes an opening region 67 away from the region including the frame 62 and the beam 63. The opening region 67 includes openings 68 that are provided inside the frame 62 and cutout portions 69 that are provided outside the frame 62. The openings 68 and the cutout portions 69 are respectively defined by the frame 62 and the beam 63. For example, the openings 68 are provided between the frame 62 and the beam 63. The opening region 67 makes it possible to reduce the weight of the back plate 61.

Figure 10:
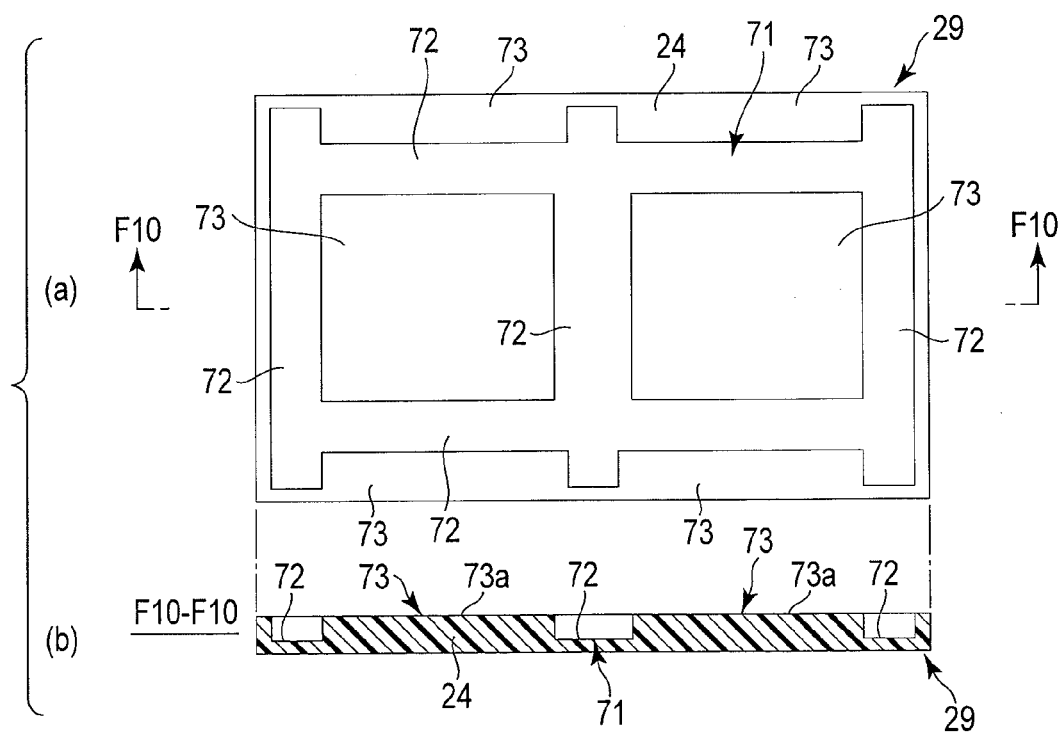
FIG. 10 is an exemplary view schematically illustrating the cover shown in FIG. 5, wherein (a) is an exemplary plan view of the cover shown in FIG. 5 and (b) is an exemplary cross-sectional view of the cover shown in FIG. 5 taken along the line F10-F10.

As shown in FIGS. 5 and 10, the rear wall 24 of the housing 21 has a step structure 71. The step structure 71 includes a plurality of grooves 72 and supporting portions 73 away from the grooves 72. The grooves 72 are provided so as to correspond to the shape of the back plate 61. That is, the grooves 72 are provided at positions corresponding to the frame 62 and the beam 63. The depth of the groove 72 is substantially equal to the thickness of the back plate 61. Therefore, the back plate 61 which is attached to the grooves 72 is accommodated in the grooves 72.

Figure 11:
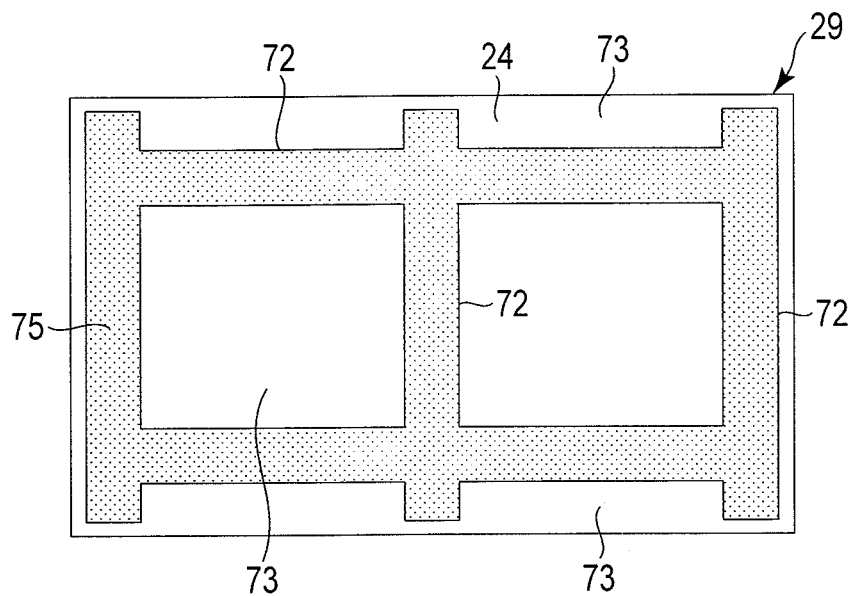
FIG. 11 is an exemplary plan view illustrating a first example of a method of fixing the back plate shown in FIG. 5.
Figure 12:
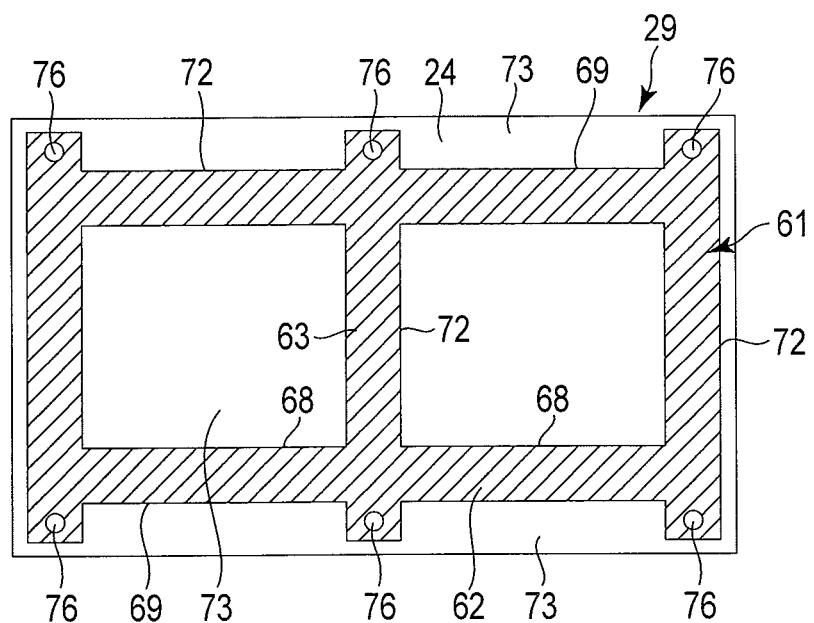
FIG. 12 is an exemplary plan view illustrating a second example of a method of fixing the back plate shown in FIG. 5.
Figure 15:
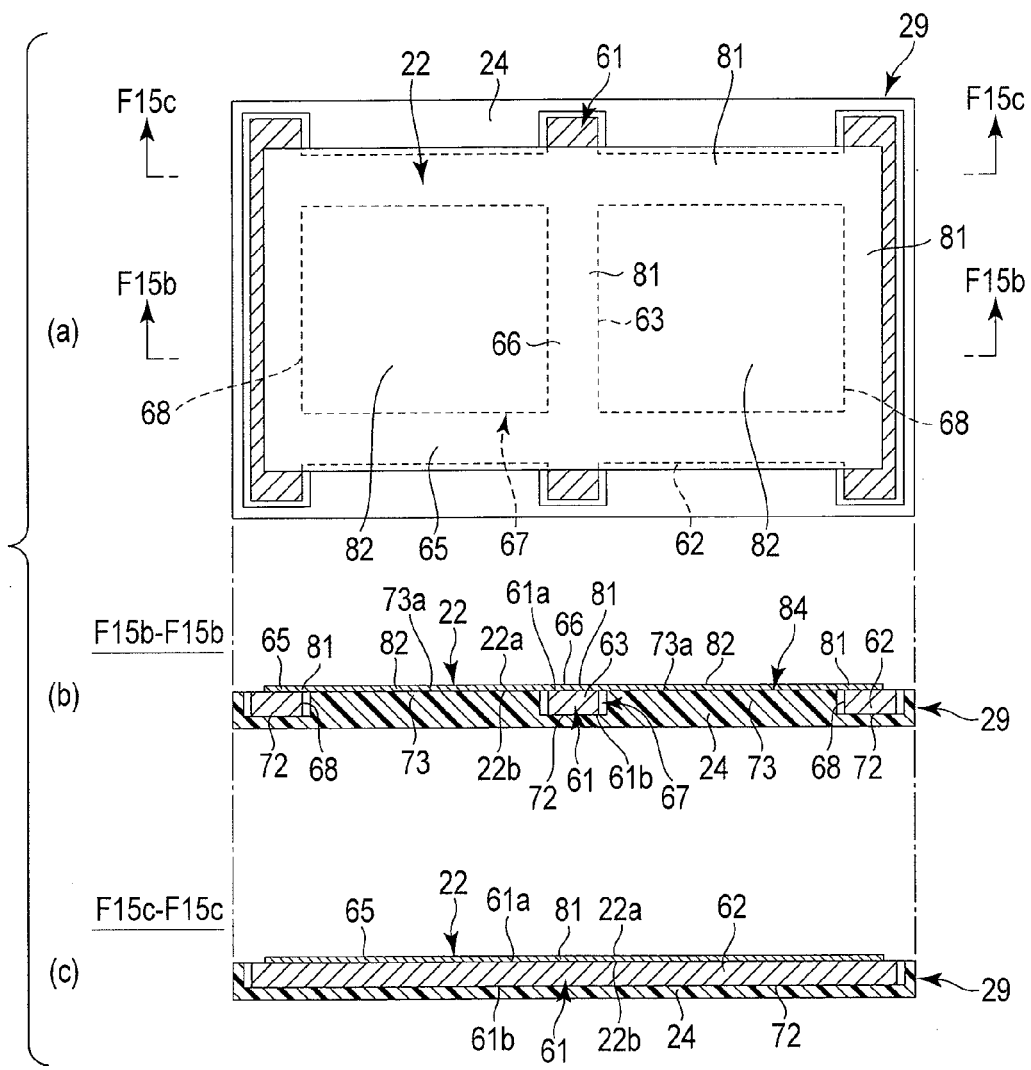
FIG. 15 is an exemplary view schematically illustrating a structure of a portion of the display unit according to the second embodiment, wherein (a) is an exemplary plan view schematically illustrating the structure of the portion of the display unit, (b) is an exemplary cross-sectional view schematically illustrating the structure of the portion of the display unit taken along the line F15b-F15b, and (c) is an exemplary cross-sectional view schematically illustrating the structure of the portion of the display unit taken along the line F15c-F15c.

As shown in FIGS. 5 and 15, the back plate 61 is attached to the grooves 72. The back plate 61 is positioned by being attached to the grooves 72. When the back plate 61 is fixed to the rear wall 24, the housing 21 is reinforced. The back plate 61 may be fixed by various methods. For example, as shown in FIG. 11, a double-sided tape 75 or an adhesive 75 is provided on the bottom of the grooves 72 and the back plate 61 is attached to the grooves with the double-sided tape 75 or the adhesive 75. In addition, as shown in FIG. 12, engaging portions 76, such as screw holes, may be provided in the grooves 72 and screws may be inserted into the screw holes to attach the back plate 61 to the grooves. Alternatively, engaging portions 76, such as protrusions or holes, may be provided in the grooves 72 and the back plate 61 may be engaged and fixed to the engaging portions 76 by, for example, pressure bonding.

Figure 13:
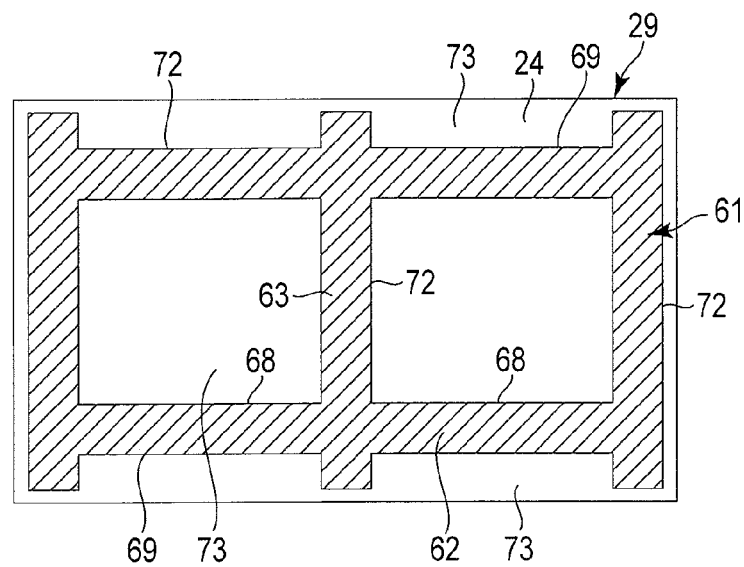
FIG. 13 is an exemplary plan view illustrating a third example of a method of fixing the back plate shown in FIG. 5.
Figure 14:
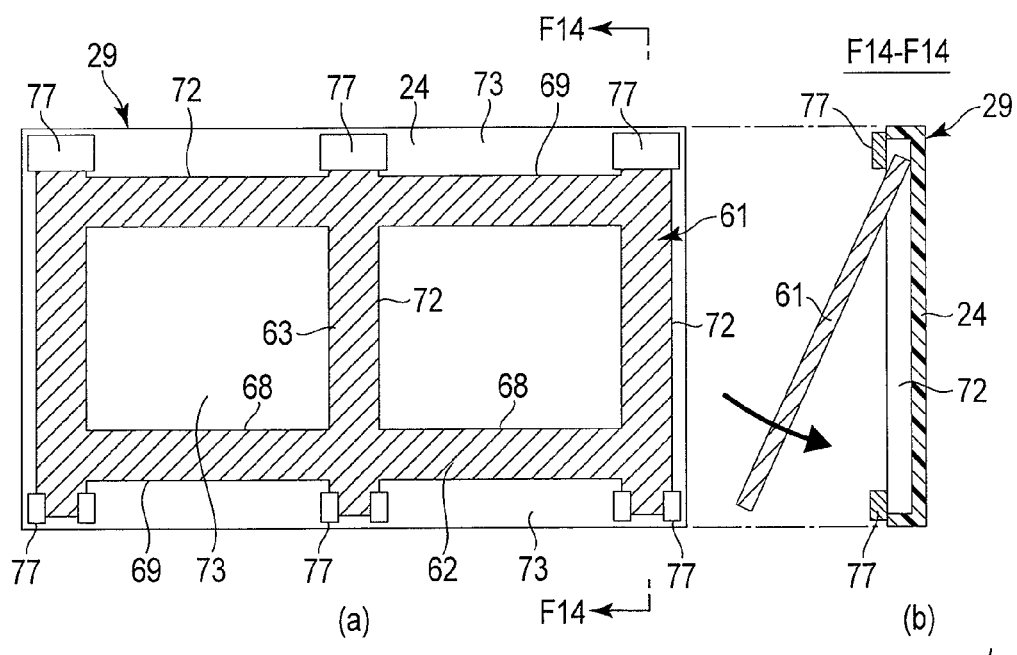
FIG. 14 is an exemplary view illustrating a fourth example of the method of fixing the back plate shown in FIG. 5, wherein (a) is an exemplary plan view of the fourth example, and FIG. (b) is an exemplary cross-sectional view of the fourth example taken along the line F14-F14.

As shown in FIG. 13, the back plate 61 may be fitted and fixed to the grooves 72, and the back plate 61 may be fitted and fixed. In addition, as shown in FIG. 14, engaging portions 77, such as claws, may be provided on the rear wall 24 and the back plate 61 may be engaged and fixed to the grooves by the engaging portions 77. As shown in FIG. 14, for example, the back plate 61 is inserted between the engaging portions 77 which are provided on one side of the cover 29 and is then inserted over the engaging portions 77 which are provided on the other side.

As shown in FIGS. 10 and 15, the supporting portion 73 is provided between the grooves 72 and includes a planar shape. The supporting portion 73 is disposed closer to the flexible display 22 than the groove 72.

As shown in FIG. 15, the flexible display 22 includes a first region 81 (first portion) and a second region 82 (second portion). The first region 81 faces the frame 62 and the beam 63 and is supported by the frame 62 and the beam 63. The second region 82 faces the opening region 67 and away from the frame 62 and the beam 63.

The supporting portion 73 passes through the opening region 67 of the back plate 61 and is disposed in the opening region 67. The supporting portion 73 faces the second region 82 of the flexible display 22 and supports the second region 82.

As shown in FIG. 15, the back plate 61 includes a first surface 61*a* that supports the flexible display 22 and a second surface 61*b* that is opposite to the first surface 61*a* and faces the grooves 72. A surface 73*a* of the supporting portion 73 is disposed so as to be substantially flush with the first surface 61*a* of the back plate 61. The surface 73*a* of the supporting portion 73 and the first surface 61*a* of the back plate 61 form a large planar portion 84 that faces substantially the entire flexible display 22. The flexible panel 31 is supported by the planar portion 84 and is maintained in a planar shape.

Next, an assembly method of the electronic apparatus 1 will be described.

Figure 6:
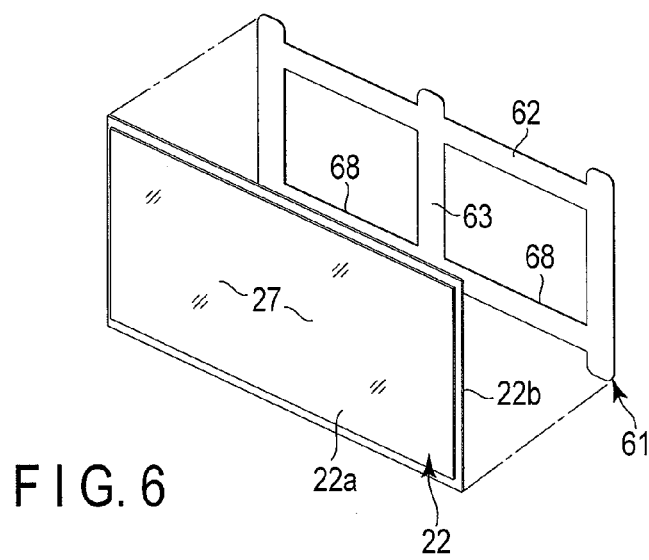
FIG. 6 is an exemplary perspective view illustrating an assembly of a back plate and a display module shown in FIG. 5.

As shown in FIG. 6, first, the flexible display 22 is fixed to the back plate 61 by, for example, a double-sided tape or an adhesive. In this way, the flexible display 22 and the back plate 61 are integrated with each other.

Then, as shown in FIG. 7, the back plate 61 integrated with the flexible display 22 is fixed to the grooves 72 of the housing 21 by the above-mentioned method. In this way, the flexible display 22 is fixed to the housing 21 with the back plate 61 interposed therebetween. That is, the back plate 61 is attached to the housing 21 and the flexible display 22 is supported by the housing 21. Then, as shown in FIG. 8, a mask 28 and a cover 29 are combined with each other. In this way, a display unit 3 is assembled.

Then, the operation of the step structure 71 of the housing 21 will be described.

For comparison, FIG. 16 shows a cover 89 without the step structure 71. In the cover 89 without the step structure 71, as shown in FIG. 16, there is a gap between the flexible display 22 and the rear wall 24. Therefore, a portion of the flexible display 22 that is not supported by the back plate 61 is likely to be curved toward the rear wall 24. Therefore, the surface of the flexible display 22 is curved, which may cause the distortion of the liquid crystal display or color blur. In addition, the thickness of the display unit 3 is increased by a value corresponding to the back plate 61.

FIG. 15 shows the cover 29 with the step structure 71. In the cover 29 with the step structure 71, as shown in FIG. 15, there is no substantial gap between the flexible display 22 and the rear wall 24. A portion of the flexible display 22 that is not supported by the back plate 61 is supported by the supporting portion 73 of the cover 29. Therefore, the flexible display 22 is less likely to be curved and the flatness of the flexible display 22 is improved. In addition, since the thickness of the back plate 61 is absorbed by the grooves 72, the thickness of the display unit 3 is less likely to increase.

According to this structure, it is possible to provide a mounting structure suitable for the flexible display 22. The mounting of the flexible display 22 makes it possible to reduce the thickness of the electronic apparatus 1. According to the structure of this embodiment, the flatness of the flexible display 22 is improved. Therefore, it is possible to improve the visibility of the screen and improve the assemblability and maintenance of the electronic apparatus 1.

For comparison, a method of directly fixing the flexible display 22 to the housing with a double-sided tape or an adhesive is considered. According to this method, it is possible to mount the flexible display 22 with a small thickness and a light weight.

However, the flexible display 22 is flexible and bendable, unlike the general displays. When the flexible display 22 having these characteristics is directly attached to the housing by a double-sided tape or an adhesive, a delicate work is needed in order to detach the flexible display 22. Therefore, when a failure, such as a positional deviation, occurs during an assembly process, it is not easy to correct the failure. In addition, during repair, it is not easy to detach the flexible display 22 from the housing 21. Therefore, the assemblability and maintenance of the display are not good.

In contrast, in this embodiment, the electronic apparatus 1 includes the back plate 61 that supports the flexible display 22. Therefore, the flexible display 22 is attached to the housing 21 while being supported by the back plate 61. That is, the flexible display 22 is attached to the housing 21 such that it is less likely to be curved. Therefore, it is easy to detach the flexible display 22 from the housing 21, as compared to the case in which the flexible display 22 is directly attached to the housing. Therefore, the assemblability or maintenance of the electronic apparatus 1 is improved.

In this embodiment, the back plate 61 that supports the flexible display 22 is attached to the housing 21 and the flexible display 22 itself is not directly attached to the housing 21. Therefore, it is possible to fix or maintain the flexible display 22 by an operation of attaching or detaching the back plate 61 with a rigidity to or from the housing 21. According to this structure, it is possible to further improve the assemblability or maintenance of the electronic apparatus 1.

Since the back plate 61 is provided, it is possible to fix the flexible display 22 to the housing 21 using a method, such as screwing or fitting, in addition to using the double-sided tape or the adhesive. Therefore, it is possible to further improve the assemblability or maintenance of the electronic apparatus 1. In addition, the back plate 61 makes it possible to improve the overall strength of the housing 21.

When a general fixing method is applied to the thin and flexible display 22, the surface of the flexible display 22 is likely to be curved during attachment. When the surface of the flexible display 22 is curved, the liquid crystal display is likely to be distorted or color blur is likely to occur.

In contrast, in this embodiment, the flexible display 22 is attached to the housing 21 while being supported by the back plate 61. That is, the flexible display 22 is attached to the housing 21 while extending on the back plate 61 such that it is less likely to be curved. In this way, it is possible to improve the flatness of the flexible display 22 and suppress an image defect.

In this embodiment, the back plate 61 includes the beam 63 that supports the central portion of the flexible display 22. When the central portion of the flexible display 22 is supported by the beam 63, the flexible display 22 is less likely to be curved.

When the back plate 61 is provided, the thickness of the housing 21 is increased by a value corresponding to the back plate 61. However, in this embodiment, the grooves 72 corresponding to the shape of the back plate 61 are provided in the cover 29 and the back plate 61 is attached to the grooves 72 of the cover 29. According to this structure, the thickness of the cover 29 can absorb the thickness of the back plate 61. Therefore, it is possible to reduce the thickness of the housing 21.

Even when the grooves 72 are provided in the cover 29, the strength of the cover 29 is not substantially reduced since the cover 29 is reinforced by the back plate 61. Therefore, even when the grooves 72 are provided in the cover 29, it is possible to maintain the thickness of the cover 29 to be small.

In this embodiment, the back plate 61 is attached to the grooves 72 and is positioned. According to this structure, it is easy to position the back plate 61 and the flexible display 22 and the assemblability or maintenance of the electronic apparatus is improved.

In this embodiment, the cover 29 includes the supporting portion 73 that is disposed in the opening region 67 of the back plate 61 and supports the flexible display 22. According to this structure, it is possible to support the flexible display 22 with the back plate 61 and the housing 21. That is, the contact area of the flexible display 22 increases and the flatness of the flexible display 22 is further improved.

FIG. 17 shows a modification of the back plate 61. The back plate 61 includes a frame 62 and two beams 63 that are provided in an X shape in the frame 62. The beams 63 support substantially the central portion of the flexible display 22. In the back plate 61 having the above-mentioned structure, it is possible to obtain the same effect as described above. In addition, the shape of the back plate 61 is not limited to the above-described embodiment, but the back plate 61 may have various shapes.

Third Embodiment

Next, an electronic apparatus 1 according to a third embodiment will be described with reference to FIG. 18. In the third embodiment, components having the same or similar functions as those in the first and second embodiments are denoted by the same reference numerals and a description thereof will not be repeated. Structures other than the following structures are the same as those in the second embodiment.

As shown in FIG. 18, in this embodiment, a light shielding member 55 is provided between a flexible display 22 and a back plate 61. The light shielding member 55 is attached to a second surface 22b of the flexible display 22 by, for example, a double-sided tape, an adhesive, or other methods and is integrated with the flexible display 22.

The back plate 61 is attached to the light shielding member 55 and supports the light shielding member 55. In addition, the back plate 61 supports the flexible display 22 via the light shielding member 55. In this embodiment, the back plate 61 is attached to the housing 21 and the flexible display 22 and the light shielding member 55 are supported by the housing 21. The supporting portion 73 of the housing 21 is disposed in the opening region 67 of the back plate 61 and comes into contact with the light shielding member 55, thereby supporting the flexible display 22 via the light shielding member 55.

According to this structure, similarly to the first embodiment, it is possible to reduce the thickness of an electronic apparatus and improve the visibility of the screen. In addition, similarly to the second embodiment, it is possible to improve the assemblability and maintenance of the electronic apparatus 1 and the flatness of the flexible display 22 and reduce the thickness and weight of the housing 21.

Fourth Embodiment

Next, an electronic apparatus 1 according to a fourth embodiment will be described with reference to FIG. 19. In the fourth embodiment, components having the same or similar functions as those in the first to third embodiments are denoted by the same reference numerals and a description thereof will not be repeated. Structures other than the following structures are the same as those in the third embodiment.

Figure 19:
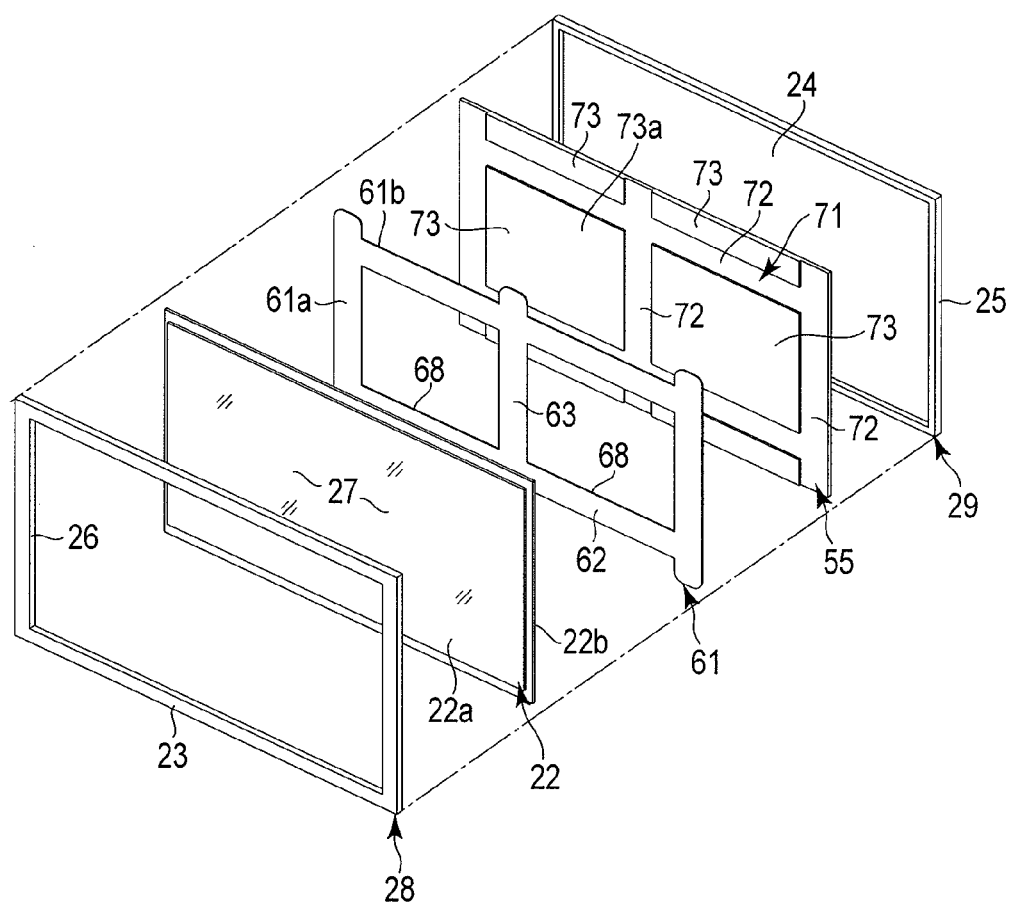
FIG. 19 is an exemplary exploded perspective view illustrating a display unit of an electronic apparatus according to a fourth embodiment.

As shown in FIG. 19, in this embodiment, a light shielding member 55 is provided between a back plate 61 and a rear wall 24 of a housing 21. In this embodiment, the rear wall 24 is not provided with a step structure 71 and has a planar shape. In this embodiment, the step structure 71 including grooves 72 and a supporting portion 73 is provided in the light shielding member 55.

Similarly to the second embodiment, the back plate 61 is attached to a flexible display 22. The light shielding member 55 is attached to the rear wall 24 of the housing 21. The back plate 61 is attached to the grooves 72 of the light shielding member 55. The supporting portion 73 of the light shielding member 55 is disposed in an opening region 67 of the back plate 61 and comes into contact with the flexible display 22, thereby supporting the flexible display 22.

According to this structure, similarly to the first embodiment, it is possible to reduce the thickness of an electronic apparatus and improve the visibility of the screen. In addition, similarly to the second embodiment, it is possible to improve the assemblability and maintenance of the electronic apparatus 1 and the flatness of the flexible display 22 and reduce the thickness and weight of the housing 21.

Fifth Embodiment

Next, an electronic apparatus 1 according to a fifth embodiment will be described with reference to FIG. 20. In the fifth embodiment, components having the same or similar functions as those in the first to fourth embodiments are denoted by the same reference numerals and a description thereof will not be repeated. Structures other than the following structures are the same as those in the third embodiment.

A back plate 61 according to this embodiment is made of a material with a light shielding property, has a light shielding function, and is one of light shielding members. Therefore, in this embodiment, a light shielding member 55 is provided only in a region away from the back plate 61. That is, the light shielding member 55 is provided so as to correspond to an opening region 67 of the back plate 61 and is disposed in the opening region 67. The light shielding member 55 is attached to a rear wall 24 of a housing 21 or a flexible display 22.

According to this structure, similarly to the first embodiment, it is possible to reduce the thickness of an electronic apparatus and improve the visibility of the screen. In addition, similarly to the second embodiment, it is possible to improve the assemblability and maintenance of the electronic apparatus 1 and the flatness of the flexible display 22 and reduce the thickness and weight of the housing 21.

Sixth Embodiment

Next, an electronic apparatus 1 according to a sixth embodiment will be described with reference to FIGS. 21, 22, and 23. In the sixth embodiment, components having the same or similar functions as those in the first to fifth embodiments are denoted by the same reference numerals and a description thereof will not be repeated. Structures other than the following structures are the same as those in the first embodiment.

Figure 21:
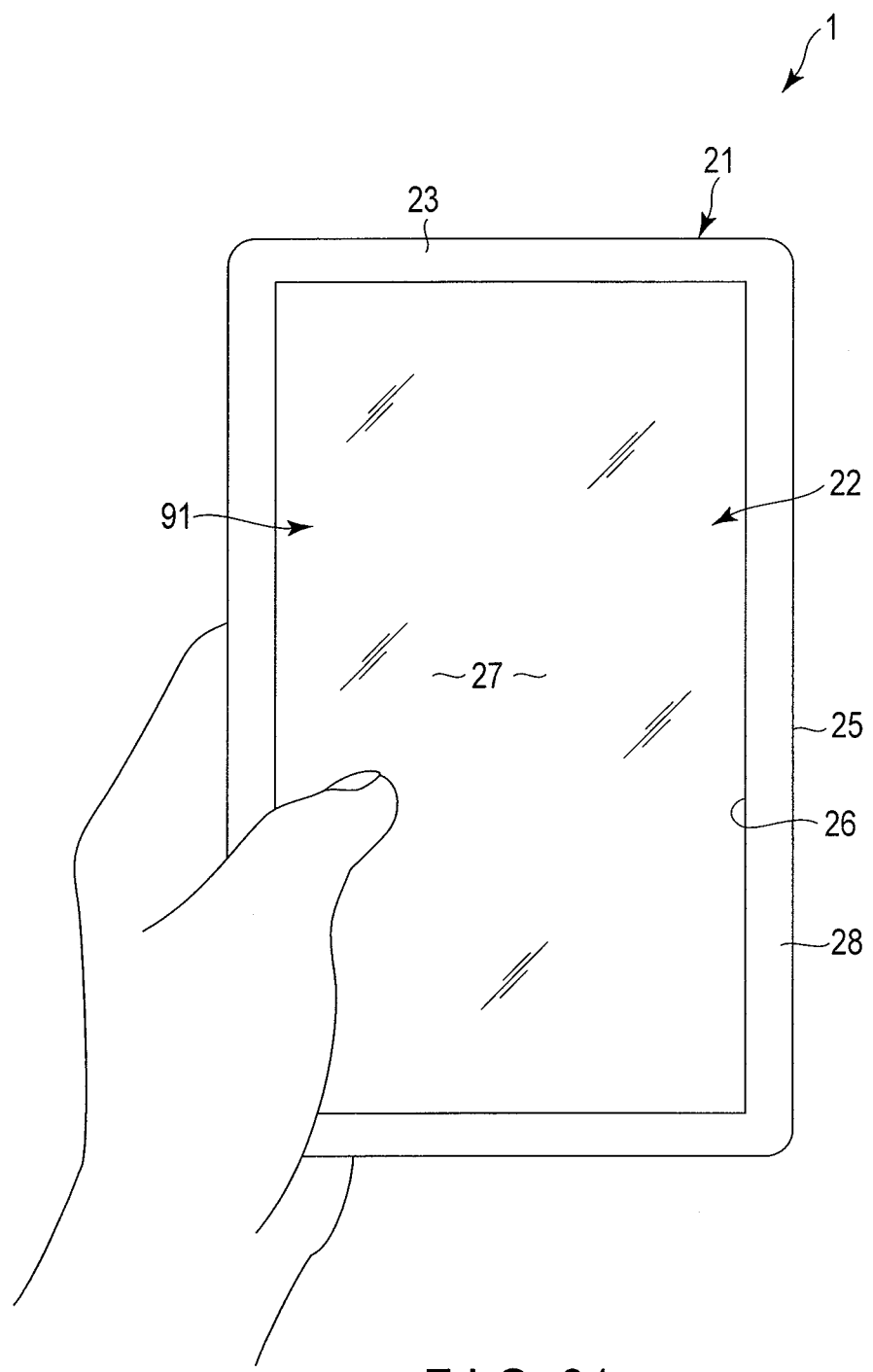
FIG. 21 is an exemplary plan view illustrating an electronic apparatus according to a sixth embodiment.

As shown in FIG. 21, the electronic apparatus 1 according to this embodiment is, for example, a tablet terminal. As shown in FIG. 22, the electronic apparatus 1 includes a touch sensor 91 that overlaps a flexible display 22. The touch sensor 91 is a user interface that has a screen which is touched with fingers and displays items on a display screen 27 such that the user can select the displayed items, for example.

Figure 22:
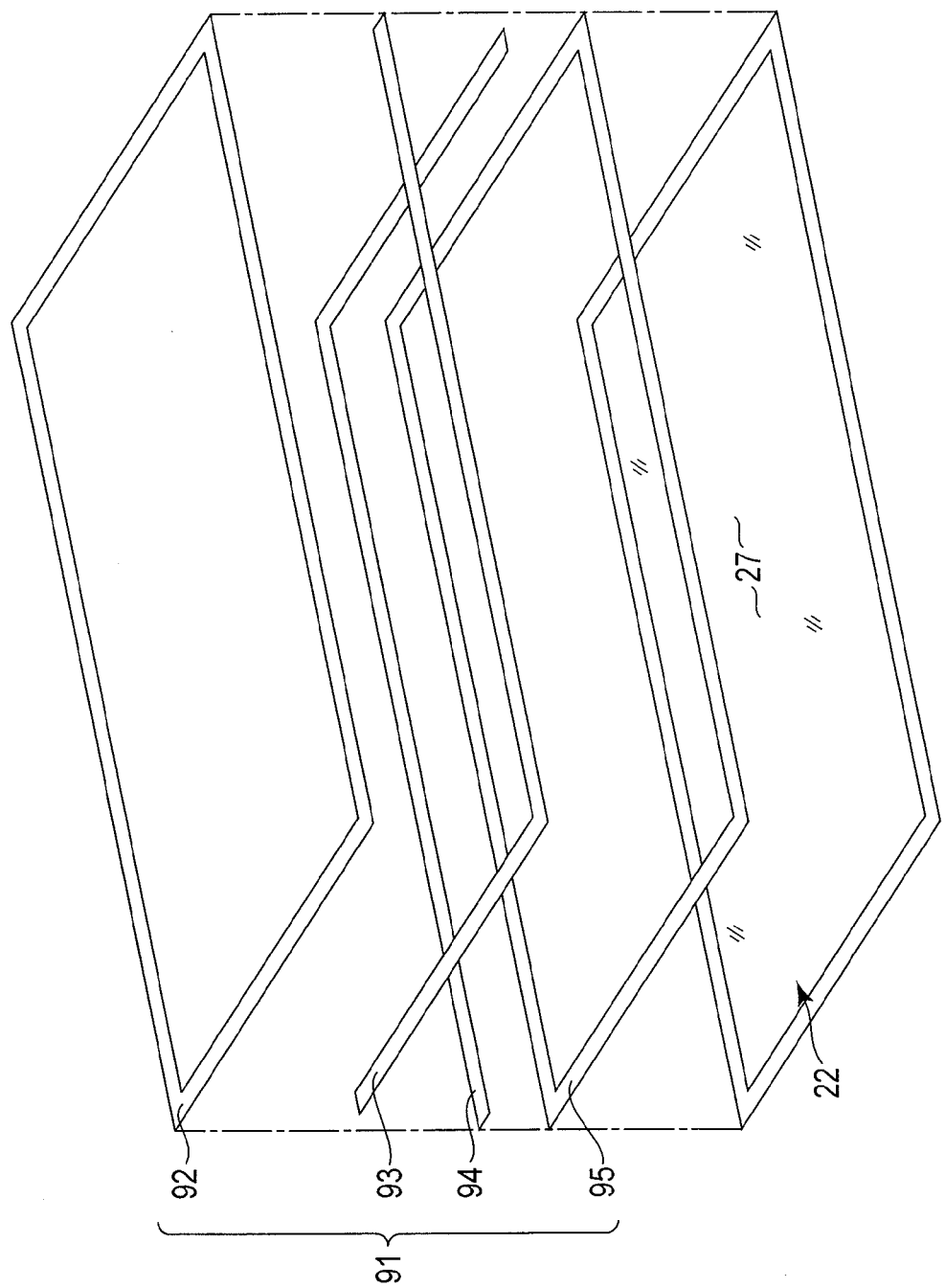
FIG. 22 is an exemplary exploded perspective view illustrating a portion of the electronic apparatus shown in FIG. 21.

As shown in FIG. 22, the touch sensor 91 includes a film sensor 92, which is a sensor main unit, a circuit board 93, a spacer 94, and a fixing frame 95. In the film sensor 92, for example, XY patterns are formed in a matrix on a rectangular vinyl film and the end of each pattern extends to the end of the film. An example of the film sensor 92 is a piezo film sensor.

The circuit board 93 and the spacer 94 are provided between the film sensor 92 and the fixing frame 95. The circuit board 93 has an L shape along a long side and a short side of the film sensor 92. The spacer 94 has an L shape along the other two sides of the film sensor 92 that do not face the circuit board 93. For example, the strength and rigidity of the circuit board 93 and the spacer 94 are more than those of the flexible display 22. The circuit board 93 is made of, for example, glass epoxy. Therefore, the strength and rigidity of the touch sensor 91 are more than those of the flexible display 22.

Figure 23:
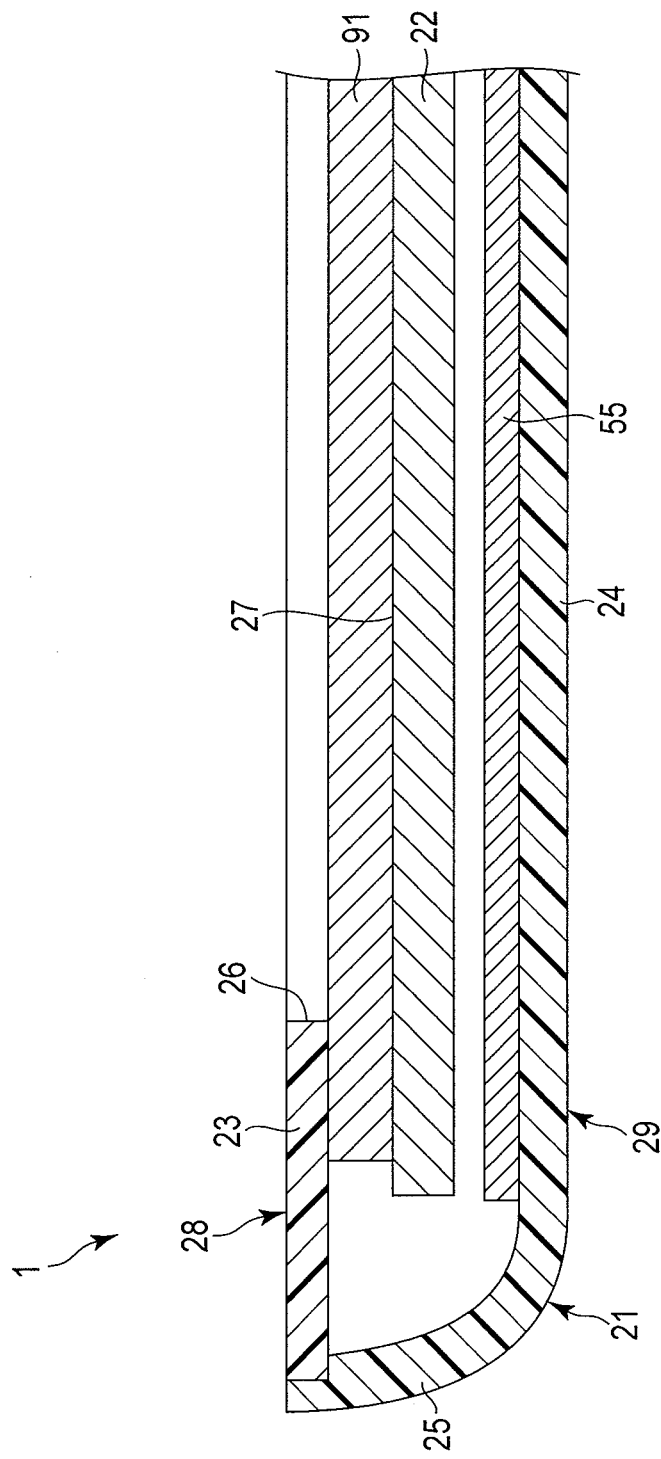
FIG. 23 is an exemplary cross-sectional view illustrating the electronic apparatus shown in FIG. 21.

As shown in FIG. 23, the touch sensor 91 overlaps the flexible display 22. The touch sensor 91 is fixed to the flexible display 22 by, for example, a double-sided tape, an adhesive, or other methods, thereby forming a touch panel.

The touch sensor 91 with relative high strength and rigidity is attached to the flexible display 22 and reinforces the flexible display 22. In this embodiment, the touch sensor 91 is an example of a "reinforcing member". In this embodiment, the back plate 61 may be omitted.

According to this structure, similarly to the first embodiment, it is possible to reduce the thickness of an electronic apparatus. In addition, according to the structure of this embodiment, the touch sensor 91 is attached to the flexible display 22 and the flexible display 22 is less likely to be curved. Therefore, similarly to the second embodiment, it is possible to improve the assemblability and maintenance of the electronic apparatus 1 and the flatness of the flexible display 22.

According to this embodiment, the touch sensor 91 reinforces the flexible display 22. Therefore, for example, the back plate 61 may be omitted. As a result, it is possible to reduce the thickness, weight, and manufacturing costs of the electronic apparatus 1.

Instead of the above-mentioned structure, the touch sensor 91 may include a sensor including a glass substrate. The sensor including the glass substrate has high strength and rigidity and can strongly reinforce the flexible display 22.

Seventh Embodiment

Next, an electronic apparatus 1 according to a seventh embodiment will be described with reference to FIGS. 24, 25, 26, and 27. In the seventh embodiment, components having the same or similar functions as those in the first to sixth embodiments are denoted by the same reference numerals and a description thereof will not be repeated. Structures other than the following structures are the same as those in the first embodiment.

As shown in FIGS. 24, 25, and 26, the electronic apparatus 1 according to this embodiment is, for example, a notebook portable computer (notebook PC) and can be opened for use in the left-right direction, like a book. The electronic apparatus 1 includes a first unit 2, a second unit 3, and hinge portions 4a and 4b. The first unit 2 includes a first display portion 101. The second unit 3 includes a second display portion 102.

In this embodiment, a flexible display 22 is provided over the first unit 2 and the second unit 3. That is, the flexible display 22 includes a first portion 103 that is provided in the first unit 2 and a second portion 104 that is provided in the second unit 3. The first portion 103 forms the first display portion 101. The second portion 104 forms the second display portion 102.

The flexible display 22 can be deformed at a first position where the first portion 103 and the second portion 104 are rotated about the hinge portions 4a and 4b and overlap each other and a second position where the first portion 103 and the second portion 104 are opened when the electronic apparatus 1 is folded or unfolded.

As shown in FIG. 27, a portion 105 (hereinafter, referred to as bent portion 105) that is stretched or bent is provided between the first portion 103 and the second portion 104. The electronic apparatus 1 includes a receiving portion 106 that supports the bent portion 105 from the exterior. The receiving portion 106 comes into contact with the bent portion 105 and receives the bent portion 105 such that the bent portion 105 is not bent at an acute angle that is equal to or more than a necessary angle. In this way, the bent portion 105 can maintain constant curvature.

According to this structure, similarly to the first embodiment, it is possible to reduce the thickness of an electronic apparatus. In addition, according to the structure of this embodiment, it is possible to provide an electronic apparatus including a large display screen 27 provided with the first and second units 2 and 3. That is, the display screen 27 is seamless between the first and second units 2 and 3. Therefore, flexibility in the display of an image increases and it is possible to display a large image. As a result, visibility is improved.

Eighth Embodiment

Next, an electronic apparatus 1 according to an eighth embodiment will be described with reference to FIG. 28. In the eighth embodiment, components having the same or similar functions as those in the first to seventh embodiments are denoted by the same reference numerals and a description thereof will not be repeated. Structures other than the following structures are the same as those in the first embodiment.

Similarly to the seventh embodiment, the electronic apparatus 1 according to this embodiment is, for example, a notebook portable computer (notebook PC) and can be opened in the left-right direction, like a book.

In the electronic apparatus 1 according to this embodiment, each of the first and second units 2 and 3 includes a flexible display 22. That is, the first unit 2 includes a first flexible display 22 provided in a first housing 6. The second unit 3 includes a second flexible display 22 provided in a second housing 21. The first flexible display 22 forms a first display portion 101. The second flexible display 22 forms a second display portion 102.

According to this structure, similarly to the first embodiment, it is possible to reduce the thickness of an electronic apparatus. In addition, according to the structure of this embodiment, unlike the seventh embodiment, it is not necessary to consider the protection of a portion (bent portion 105) that is bent at an acute angle in the flexible display 22. Therefore, it is possible to reduce the thickness, weight, and manufacturing costs of the electronic apparatus 1.

Ninth Embodiment

Next, an electronic apparatus 1 according to a ninth embodiment will be described with reference to FIGS. 29 and 30. In the ninth embodiment, components having the same or similar functions as those in the first to eighth embodiments are denoted by the same reference numerals and a description thereof will not be repeated. Structures other than the following structures are the same as those in the first embodiment.

As shown in FIG. 29, in this embodiment, a rear wall 24 of a housing 21 includes a planar portion 111 that is provided at the center of the rear wall 24 and a curved surface portion 112 that is provided at the end of the rear wall 24 and is bent from the planar portion 111 in an arc shape. The flexible display 22 is provided from the planar portion 111 to the curved surface portion 112.

Figure 30:
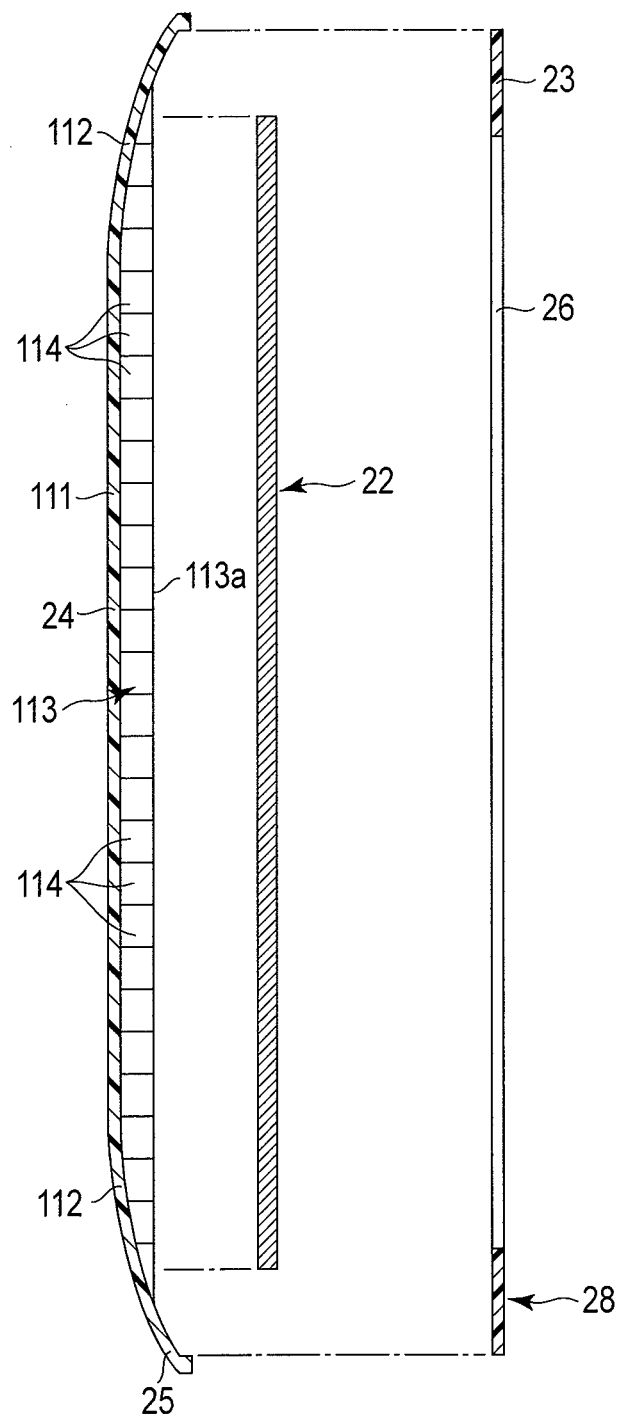
FIG. 30 is an exemplary exploded cross-sectional view illustrating the display unit shown in FIG. 29.

As shown in FIG. 30, the rear wall 24 includes a supporting portion 113 (base) provided in a portion to which the flexible display 22 is attached. The supporting portion 113 is provided from the planar portion 111 to the curved surface portion 112. The supporting portion 113 includes, for example, a plurality of ribs 114 provided on the inner surface of the housing 21. The rib 114 is, for example, a honeycomb rib.

The leading ends of the ribs 114 have substantially the same height and form a supporting surface 113a in the housing 21. The supporting surface 113a is a virtual surface obtained by connecting the leading ends of the ribs 114. The flexible display 22 is attached to the supporting surface 113a and is supported in a planar shape. That is, the flexible display 22 is supported in a planar shape by the leading ends of the ribs 114.

According to this structure, similarly to the first embodiment, it is possible to reduce the thickness of an electronic apparatus. In addition, according to the structure of this embodiment, in the electronic apparatus 1 in which the curved surface portion 112 is provided in the housing 21, it is possible to improve the flatness of the flexible display 22.

Tenth Embodiment

Next, an electronic apparatus 1 according to a tenth embodiment will be described with reference to FIG. 31. In the tenth embodiment, components having the same or similar functions as those in the first to ninth embodiments are denoted by the same reference numerals and a description thereof will not be repeated. Structures other than the following structures are the same as those in the first embodiment.

As shown in FIG. 31, a housing 21 includes a planar portion 111 and a curved surface portion 112. A flexible display 22 is provided from the planar portion 111 to the curved surface portion 112. The flexible display 22 includes a first portion 121 (first region) that is provided in the planar portion 111 and a second portion 122 (second region) that is provided in the curved surface portion 112. The first portion 121 is a flat portion that is formed in a planar shape along the planar portion 111 of the housing 21. The second portion 122 is a curved surface portion that is curved in an arc shape along the curved surface portion 112 of the housing 21.

In this embodiment, images subjected to different processes are displayed on the first portion 121 and the second portion 122. A first image subjected to a general process is displayed on the first portion 121. The "general process" is, for example, the same process as that performed in the display apparatus according to the related art. The first image has no distortion when it is viewed from a direction (in FIG. 31, the direction of an arrow A) substantially perpendicular to the first portion 121.

A second image that has been changed is displayed on the second portion 122. The second image is distorted in the opposite direction in advance such that it has no distortion (in FIG. 31, the direction of the arrow) as viewed in a direction crossing the second portion 122. Therefore, the first image and the second image are continuous without any incongruity therebetween, as viewed from the direction of the arrow A in FIG. 31. In addition, for example, a circuit board 5, which is a main board, processes the first image and the second image. The circuit board 5 is an example of a "controller".

According to this structure, similarly to the first embodiment, it is possible to reduce the thickness of an electronic apparatus. In addition, according to the structure of this embodiment, in the electronic apparatus 1 in which the curved surface portion 112 is provided in the housing 21, it is possible to provide a large display screen 27 using the characteristics of the flexible display 22. The curved surface portion 112 is an example of an "inclined portion". The housing 21 may include an inclined portion that is inclined in a straight line, instead of the curved surface portion 112 that is curved in an arc shape. The flexible display 22 may include a first portion 121 corresponding to the planar portion of the housing 21 and a second portion 122 corresponding to the inclined portion of the housing 21.

Eleventh Embodiment

Next, an electronic apparatus 1 according to an eleventh embodiment will be described with reference to FIG. 32. In the eleventh embodiment, components having the same or similar functions as those in the first to tenth embodiments are denoted by the same reference numerals and a description thereof will not be repeated. Structures other than the following structures are the same as those in the first embodiment.

The electronic apparatus 1 according to this embodiment is, for example, a television 131. The television 131 has any one of the structures according to the first to tenth embodiments. According to the television 131, it is possible to obtain the same effect as that of the first to tenth embodiments.

According to the first to eleventh embodiments, it is possible to optimize the mounting structure of a flexible display (flexible panel).

The embodiments are not limited to the above-described embodiments, but the components of the above-described embodiments may be changed without departing from the scope and spirit of the invention. In addition, a plurality of components according to the above-described embodiments may be appropriately combined with each other to form various structures. For example, some of the components according to the above-described embodiments may be removed. Components according to different embodiments may be appropriately combined with each other.

In the specification, the "flexible display" (or the "flexible panel") is not limited to the display using liquid crystal. For example, the flexible display includes an organic electroluminescence (EL) display or other types of displays. In the above-described embodiments, the flexible display 22 includes two plastic substrates, but the embodiments are not limited thereto. For example, in the case of the organic EL display, the flexible display 22 may include one plastic substrate, a sealing film, and organic EL elements provided therebetween.

The material forming the TFT 45 is not limited to an oxide semiconductor, but may be low-temperature polysilicon, amorphous silicon, an organic semiconductor, or other materials. In the above-described embodiments, the first and second flexible substrates are plastic substrates, but the embodiments are not limited thereto. For example, the first and second flexible substrates may be made of other materials. The structures according to the first to eleventh embodiments can be widely applied to various kinds of electronic apparatuses, such as televisions, tablet terminals, mobile phones, and smart phones.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing comprising a first wall and a second wall, the first wall comprising an opening, the second wall opposite to the first wall;
a flexible display in the housing, the flexible display comprising a display screen exposed through the opening; and
a reinforcing member attached to the flexible display, the reinforcing member comprising a frame, a beam extending inside the frame, and an opening region between the frame and the beam,
wherein the second wall comprises a supporting portion projecting from the second wall toward the flexible display, the supporting portion inserted into the opening region of the reinforcing member and configured to support the flexible display at a region away from the frame and the beam.

2. The electronic apparatus of claim 1,
wherein the beam is configured to support a central portion of the flexible display.

3. The electronic apparatus of claim 1,
wherein the second wall comprises a groove corresponding to the frame and the beam, and
the reinforcing member is attached to the groove.

4. The electronic apparatus of claim 3,
wherein the groove has a depth substantially equal to a thickness of the reinforcing member, and
the reinforcing member is in the groove.

5. The electronic apparatus of claim 3,
wherein the reinforcing member is positioned by and fitted into the groove.

6. The electronic apparatus of claim 1,
wherein the flexible display is attached to the reinforcing member in a flat state, and
the reinforcing member is attached to the housing while maintaining flatness of the display screen of the flexible display.

7. The electronic apparatus of claim 6,
wherein the flexible display is fixed to the housing by the reinforcing member, and
the flexible display is configured to be detached from the housing with the flatness of the display screen maintained, by removal of the reinforcing member from the housing.

8. The electronic apparatus of claim 1,
wherein the flexible display comprises a first surface and a second surface opposite to the first surface, the first surface comprising the display screen, and
the reinforcing member is a plate along the second surface.

9. The electronic apparatus of claim 1,
wherein an outline of the reinforcing member comprises a portion inside of an outline of the flexible display.

10. An electronic apparatus comprising:
a housing comprising a first wall and a second wall, the first wall comprising an opening, the second wall opposite to the first wall;
a flexible display in the housing; and
a reinforcing member configured to support the flexible display, the reinforcing member comprising a frame, a beam extending inside the frame and an opening region between the frame and the beam, wherein the second wall comprises a first groove corresponding to the frame and a second groove corresponding to the beam, and the frame is placed into the first groove and the beam is placed into the second groove.

11. The electronic apparatus of claim 10, wherein the flexible display is attached to the reinforcing member in a flat state, and the reinforcing member is attached to the housing while maintaining flatness of the display screen of the flexible display.

12. The electronic apparatus of claim 11, wherein the flexible display is fixed to the housing by the reinforcing member, and the flexible display is configured to be detached from the housing with the flatness of the display screen maintained, by removal of the reinforcing member from the housing.

13. The electronic apparatus of claim 10, wherein the first groove has a depth substantially equal to a thickness of the frame, and the second groove has a depth substantially equal to a thickness of the beam, and the frame is in the first groove and the beam is in the second groove.

14. The electronic apparatus of claim 10, wherein the reinforcing member is positioned by the frame fitting into the first groove and the beam fitting into the second groove.

15. The electronic apparatus of claim 10, wherein the second wall comprises a supporting portion projecting from the second wall toward the flexible display, the supporting portion inserted into the opening region of the reinforcing member and configured to support the flexible display.

* * * * *